(12) United States Patent
Wahrmund et al.

(10) Patent No.: US 9,812,031 B1
(45) Date of Patent: Nov. 7, 2017

(54) SYSTEMS AND METHODS FOR TRACKING POSITION OF A MOVING TRANSMISSION SOURCE

(71) Applicants: Sean Jeffrey Wahrmund, Dallas, TX (US); John S. Hogg, Jr., Bedford, TX (US)

(72) Inventors: Sean Jeffrey Wahrmund, Dallas, TX (US); John S. Hogg, Jr., Bedford, TX (US)

( * ) Notice: Subject to any disclaimer, the term of this patent is extended or adjusted under 35 U.S.C. 154(b) by 0 days.

(21) Appl. No.: 15/429,103

(22) Filed: Feb. 9, 2017

Related U.S. Application Data

(60) Provisional application No. 62/293,269, filed on Feb. 9, 2016.

(51) Int. Cl.
| | | |
|---|---|---|
| *G09B 15/00* | (2006.01) | |
| *G09B 19/00* | (2006.01) | |
| *G01S 5/06* | (2006.01) | |
| *G01S 5/02* | (2010.01) | |
| *G06T 11/60* | (2006.01) | |

(52) U.S. Cl.
CPC .......... *G09B 19/003* (2013.01); *G01S 5/0226* (2013.01); *G01S 5/0294* (2013.01); *G01S 5/06* (2013.01); *G09B 15/00* (2013.01); *G06T 11/60* (2013.01); *G06T 2200/24* (2013.01)

(58) Field of Classification Search
CPC ......... G09B 19/003; G09B 15/00; G01S 5/06; G01S 5/0226; G01S 5/0294
See application file for complete search history.

(56) References Cited

U.S. PATENT DOCUMENTS 2,412,238 A * 12/1946 Wassell .................. G09B 29/00
116/325
2,579,105 A * 12/1951 Baldine .................. G09B 19/22
116/222

(Continued)

OTHER PUBLICATIONS

Bowman, Stuart. (2012). DotBook (Version 2.0.2) [Mobile application software]. Retrieved on Apr. 20, 2017 from http://appcrawlr.com/ios/dotbook in 2 pages.

(Continued)

*Primary Examiner* — Thomas G Black
*Assistant Examiner* — Peter D Nolan
(74) *Attorney, Agent, or Firm* — Knobbe, Martens, Olson & Bear, LLP

(57) ABSTRACT

A system for tracking position of one or more moving transmission sources is disclosed. The transmission source can transmit a signal while moving from a first position to a first expected position and a receiver can receive the signal. The transmission source can include an antenna. An audio source can transmit an audio signal at a predetermined frequency and a controller can determine a second position of the transmission source, calculate an offset between the second position with the first expected position, and compare the offset with a predetermined threshold. A first rate of movement can be calculated based on a distance traveled between the first position and the second position with respect to the predetermined frequency. A first indication can be transmitted to at least one user device including the first location offset with the predetermined threshold and the first rate of movement.

13 Claims, 39 Drawing Sheets

(56) References Cited

U.S. PATENT DOCUMENTS

| | | | | |
|---|---|---|---|---|
| 3,139,687 | A * | 7/1964 | Hamer | G09B 19/22 116/325 |
| 3,340,621 | A * | 9/1967 | Snyder | G09B 19/22 434/255 |
| 3,704,532 | A * | 12/1972 | Dambach | G09B 1/10 434/255 |
| 4,176,471 | A * | 12/1979 | Roe | A61H 3/00 434/255 |
| 5,346,210 | A * | 9/1994 | Utke | A63B 24/0021 273/372 |
| 2012/0249798 | A1 | 10/2012 | Kim | |
| 2013/0231131 | A1 | 9/2013 | Colazingari | |
| 2013/0346217 | A1 | 12/2013 | Pandey et al. | |
| 2014/0361928 | A1 * | 12/2014 | Hughes | G01S 19/48 342/463 |
| 2015/0002337 | A1 | 1/2015 | Wisherd et al. | |
| 2015/0005011 | A1 | 1/2015 | Nehrenz et al. | |
| 2015/0378002 | A1 * | 12/2015 | Hughes | G01S 5/0294 342/451 |

OTHER PUBLICATIONS

Dieter, Trina. (2014). Drill for Marching Band (Version 1.2) [Mobile application software]. Retrieved on Apr. 20, 2017 from http://appcrawlr.com/ios/drill-for-marching-band in 2 pages.

Pygraphics, Inc. (2014). Pyware 3D Viewer [Mobile application software]. Retrieved on Apr. 20, 2017 from http://appcrawlr.com/app/show/3863140 in 2 pages.

Rundell, Scott. (2011). DrillBook for Apple iOS and Android [Mobile application software]. Retrieved on Apr. 20, 2017 from http://appcrawlr.com/ios/drillbook in 2 pages.

Rundell, Scott. (Aug. 2012). DrillBook Next: Director Version (Version 2.2.5) [Mobile application software]. Retrieved on Apr. 20, 2017 from http://appcrawlr.com/ios/drillbook-next in 2 pages.

* cited by examiner

FIG. 2

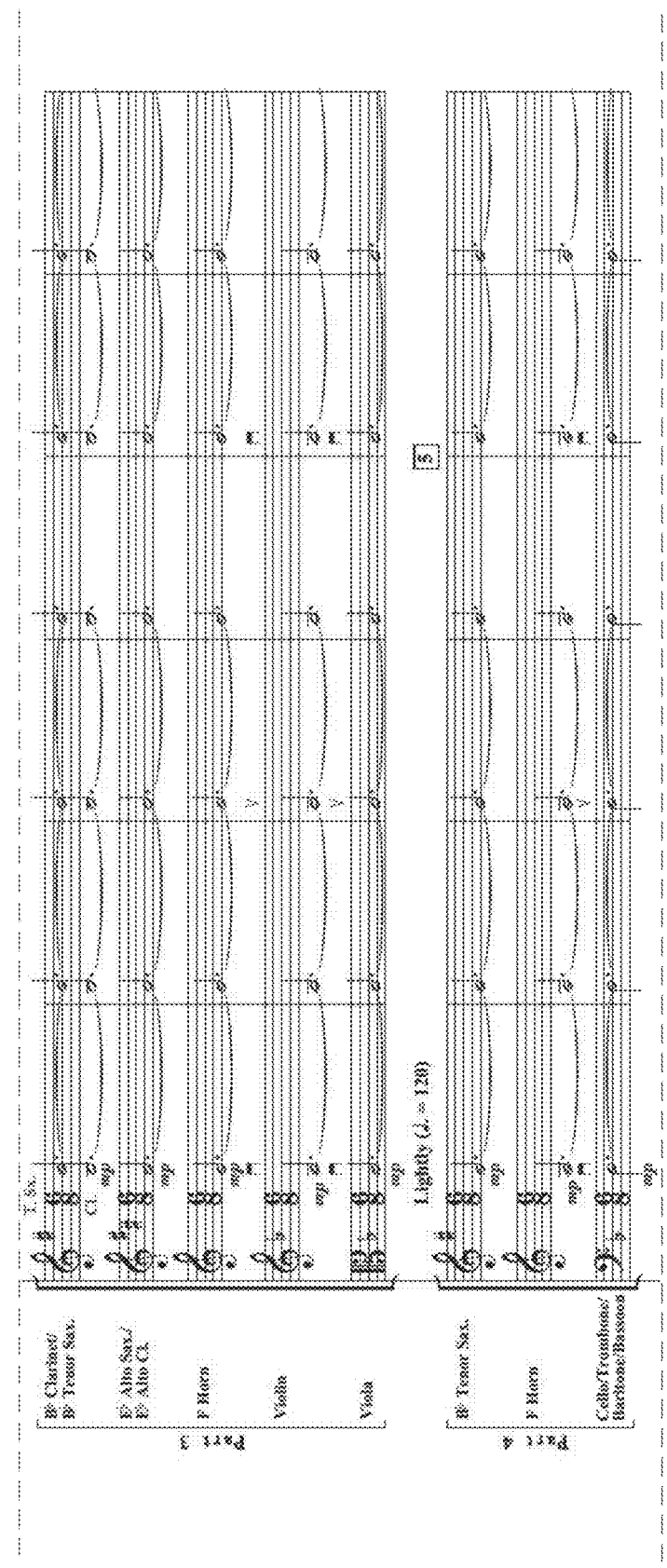
FIG. 2 Contiuned

Director Viewpoint

Marching Roster Identification Information

Trumpet

Drill: Latin Fire
Performing as cast member: Trumpet    Label: 8    Symbol: T

| Set | Move | Count | South-North | Back-Front |
|---|---|---|---|---|
| #1 | 0 | 0 | 4.0 stps inside South 35 yd ln | 14.0 stps in frnt of Front hash (NCAA) |
| #1A | 8 | 8 | 0.875 stps inside South 40 yd ln | 14.75 stps in frnt of Front hash (NCAA) |
| #2 | 10 | 18 | 1.0 stp inside South 45 yd ln | 16.0 stps behind Front side line |
| #3 | 8 | 24 | 1.0 stp inside South 45 yd ln | 16.0 stps behind Front side line |
| #4 | 16 | 40 | On 50 yd ln | 2.0 stps in frnt of Front hash (NCAA) |
| #5 | 16 | 56 | 4.0 stps North of 50 yd ln | 16.0 stps behind Front side line |
| #6 | 16 | 72 | 2.0 stps North of 50 yd ln | 12.0 stps behind Front side line |
| #7 | 16 | 88 | 2.0 stps North of 50 yd ln | 4.0 stps behind Front side line |
| #8 | 28 | 116 | 4.0 stps outside North 45 yd ln | 14.0 stps behind Front side line |
| #9 | 10 | 126 | 4.0 stps outside North 45 yd ln | 8.0 stps behind Front side line |
| #10 | 16 | 142 | 4.0 stps outside North 45 yd ln | 3.0 stps behind Front side line |
| #11 | 12 | 154 | On North 45 yd ln | 9.0 stps behind Front side line |
| #12 | 14 | 168 | On North 45 yd ln | 16.0 stps behind Front side line |
| #13 | 16 | 184 | 2.0 stps North of 50 yd ln | 16.0 stps behind Front side line |
| #14 | 24 | 208 | 2.0 stps North of 50 yd ln | 16.0 stps behind Front side line |
| #14A | 16 | 224 | 4.0 stps North of 50 yd ln | 4.0 stps behind Front side line |
| #15 | 12 | 236 | 4.0 stps North of 50 yd ln | 4.0 stps behind Front side line |
| #16 | 16 | 252 | 2.0 stps inside North 40 yd ln | on Front side line |
| #17 | 12 | 264 | On North 40 yd ln | 8.0 stps behind Front side line |
| #18 | 8 | 272 | On North 40 yd ln | 12.0 stps behind Front side line |
| #19 | 32 | 304 | 4.0 stps outside North 45 yd ln | on Front hash (NCAA) |
| #20 | 24 | 328 | 0.625 stps outside North 45 yd ln | 11.25 stps in frnt of Front hash (NCAA) |
| #21 | 24 | 352 | 4.0 stps outside North 45 yd ln | 16.0 stps behind Front side line |
| #22 | 12 | 364 | On North 40 yd ln | 16.0 stps behind Front side line |
| #23 | 16 | 380 | On North 40 yd ln | 12.0 stps in frnt of Front hash (NCAA) |
| #24 | 24 | 404 | On South 45 yd ln | 15.0 stps in frnt of Front hash (NCAA) |
| #25 | 16 | 420 | 4.0 stps inside South 45 yd ln | 8.0 stps behind Front side line |
| #26 | 12 | 432 | 2.0 stps inside South 45 yd ln | 8.0 stps behind Front side line |
| #27 | 24 | 456 | On South 40 yd ln | on Front side line |

Set Number

Set Arrival Beat in the music

Number of Beats to Arrive at Set

Side to Side Location

Front to Back Location

Fig. 5

| Event | Set | Measure | Beat | Audible Timesource Offset (ft.) | Location | Melody Note | Metronome |
|---|---|---|---|---|---|---|---|
| 1 | 1 | 1 | 1 | 51 | 1: 4.0 steps inside 25 yard line, 5.0 steps behind back hash | | 1 |
| 2 | 1.1 | 2 | 2 | 52 | 1: 3.0 steps outside 30 yard line, 5.0 steps behind back hash | | 2 |
| 3 | 1.2 | 3 | 3 | 53 | 1: 2.0 steps outside 30 yard line, 5.0 steps behind back hash | | 3 |
| 4 | 1.3 | 4 | 4 | 54 | 1: 1.0 steps outside 30 yard line, 5.0 steps behind back hash | | 4 |
| 5 | 1.4 | 5 | 5 | 55 | 1: On 30 yard line, 5.0 steps behind back hash | | 1 |
| 6 | 1.5 | 6 | 6 | 56 | 1: 1.0 steps inside 30 yard line, 5.0 steps behind back hash | | 2 |
| 7 | 2 | 7 | 7, 8 | 56 | 1: 1.0 steps inside 30 yard line, 5.0 steps behind back hash | | 3, 4 |
| 8 | 2.1 | 8 | 9 | 55 | 1: On 30 yard line, 5.0 steps behind back hash | | 1 |
| 9 | 2.2 | 9 | 10 | 54 | 1: 1.0 steps outside 30 yard line, 5.0 steps behind back hash | | 2 |
| 10 | 2.3 | 10 | 11 | 53 | 1: 2.0 steps outside 30 yard line, 5.0 steps behind back hash | | 3 |
| 11 | 2.4 | 11 | 12 | 52 | 1: 3.0 steps outside 30 yard line, 5.0 steps behind back hash | | 4 |
| 12 | 2.5 | 12 | 13 | 51 | 1: 4.0 steps inside 25 yard line, 5.0 steps behind back hash | | 1 |
| 13 | 2.6 | 13 | 14 | 50 | 1: 3.0 steps inside 25 yard line, 5.0 steps behind back hash | | 2 |
| 14 | 3 | 14 | 15, 16 | 50 | 1: 3.0 steps inside 25 yard line, 5.0 steps behind back hash | | 3, 4 |

Fig. 11

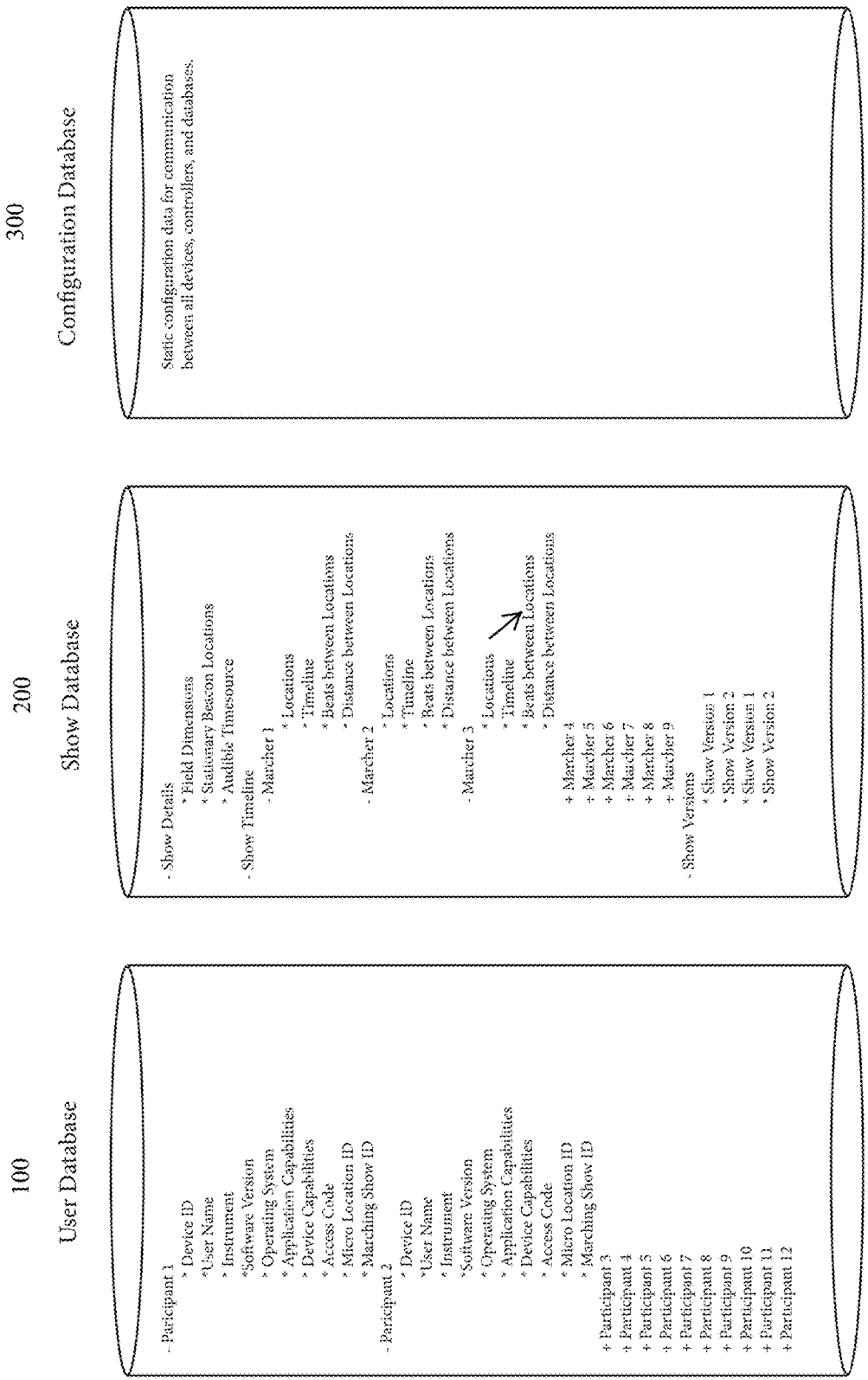

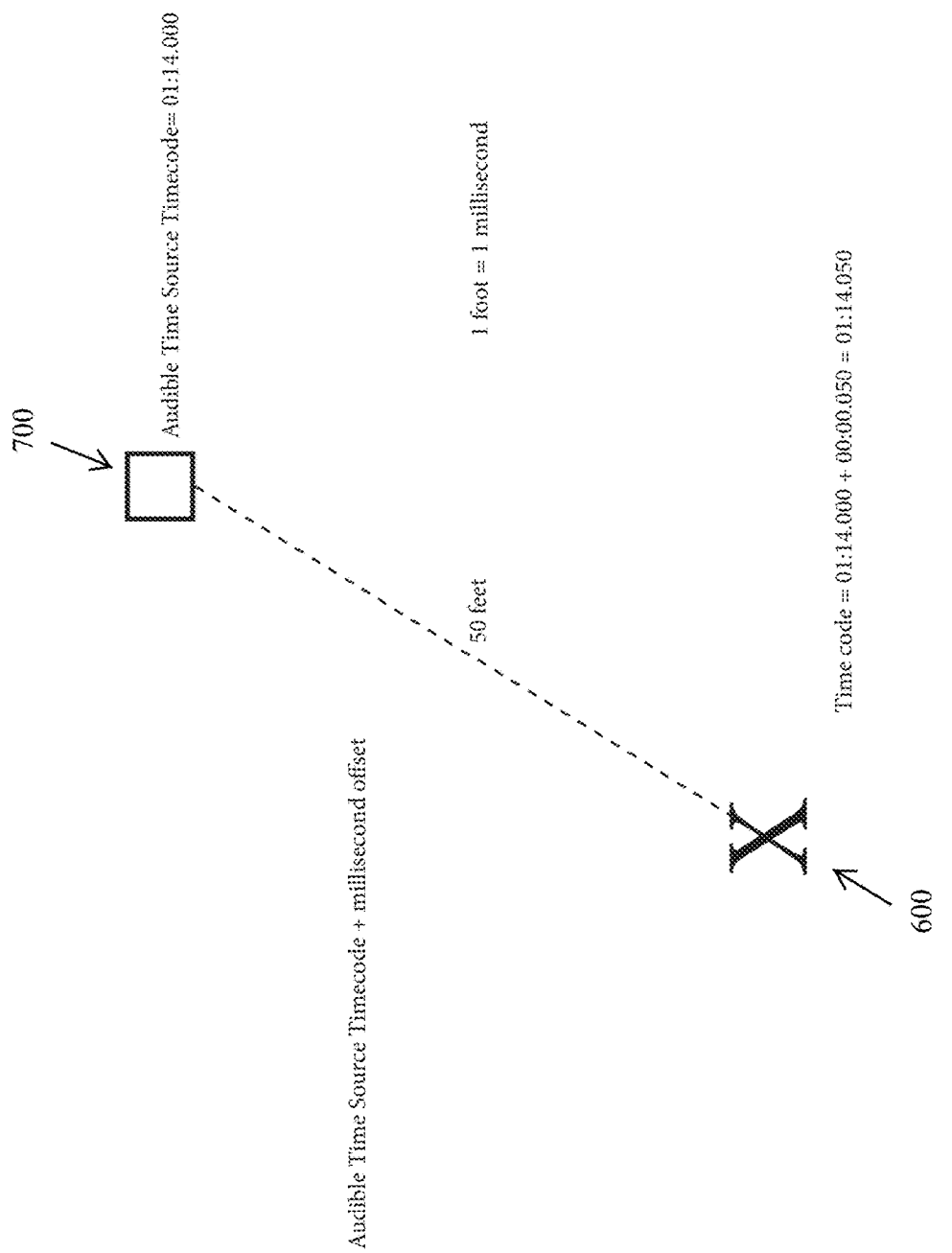

| Event # | Predetermined location | Actual location |
|---|---|---|
| 1 | 1: 3 steps inside 40, 0 steps outside ft. sideline | 2.5 steps inside side 1 40, .5 steps outside ft. sideline |
| 2 | 1: 2 steps inside 35, 0 steps outside ft. sideline | 4 steps inside side 1 35, 2 steps outside ft. sideline |
| 3 | 1: 3 steps inside 40, 0 steps outside ft. sideline | 6 steps inside side 1 40, 8 steps outside ft. sideline |
| 4 | 1: 3.5 steps outside 45, 4.5 steps inside ft. sideline | 1: 3.5 steps outside 45, 4.5 steps inside ft. sideline |
| 5 | 1: 3 steps inside 40, 0 steps outside ft. sideline | 2.5 steps inside side 1 40, .5 steps outside ft. sideline |
| 6 | 2: 2 steps inside 45, 6 steps inside ft. sideline | 2: 3 steps outside 45, 5 steps inside ft. sideline |
| 7 | on 50, on ft. sideline | on 50, on ft. sideline |

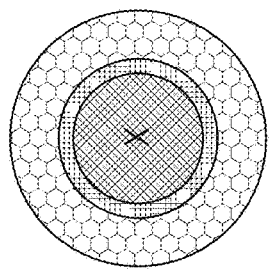

FIG. 24

| Event | Expected Step Size | Actual Step Size |
|---|---|---|
| Step 1 | 22.5 inches | 18 inches |
| Step 2 | 22.5 inches | 16 inches |
| Step 3 | 22.5 inches | 22.5 inches |
| Step 4 | 22.5 inches | 6 inches |
| Step 5 | 22.5 inches | 35 inches |

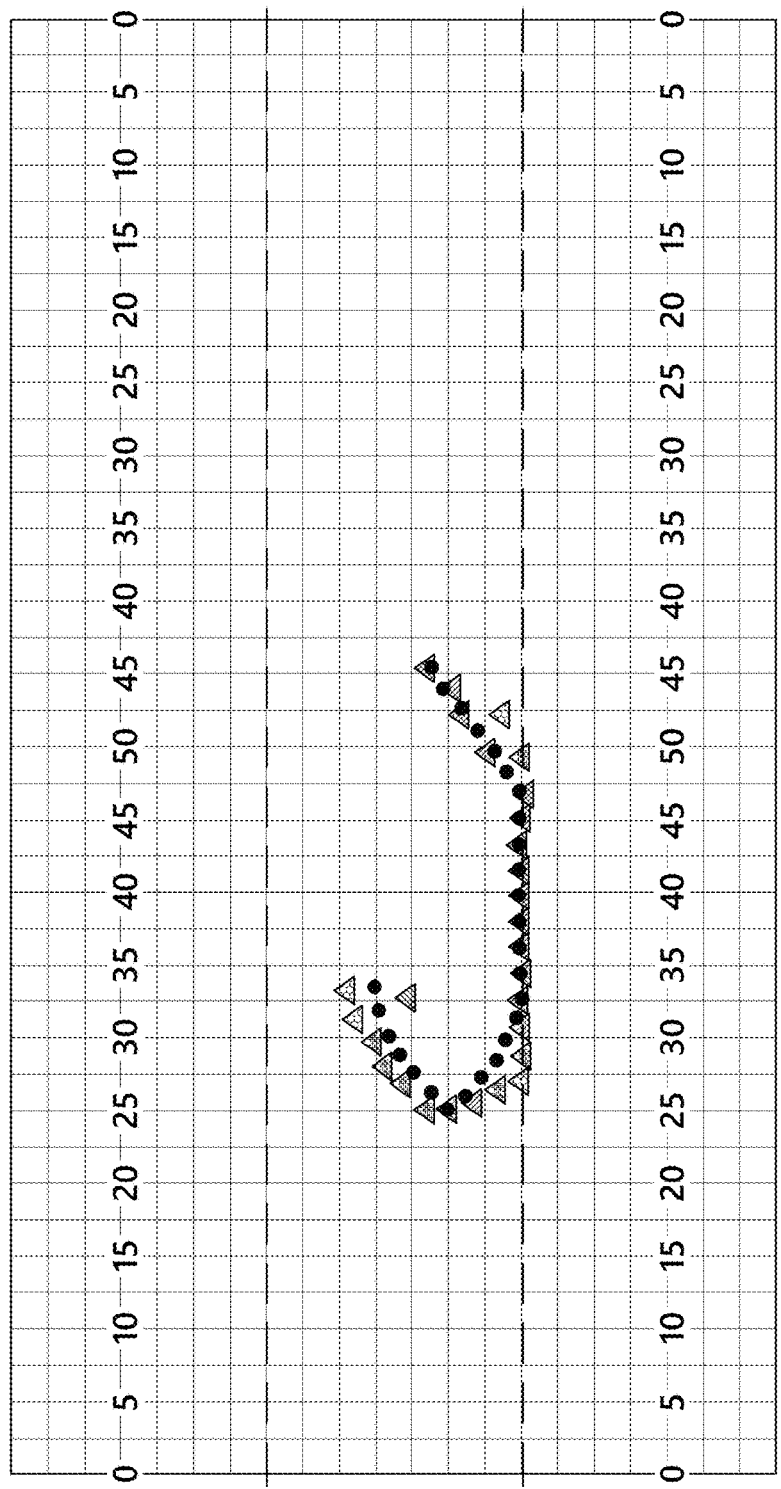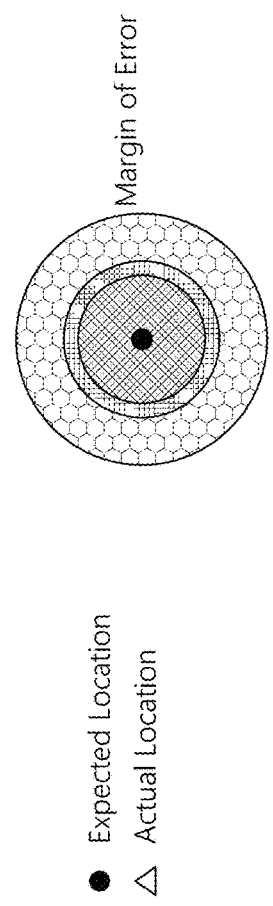
FIG. 29

SYSTEMS AND METHODS FOR TRACKING POSITION OF A MOVING TRANSMISSION SOURCE

BACKGROUND

Technical Field

Embodiments described herein relate to apparatuses, systems, and methods for a location tracking system for tracking a plurality of transmission sources including one or more antennas against a sequence of expected locations over time.

Description of the Related Art

Transmission sources can include one or more antennas for transmitting signals that can be received by receivers. The transmission sources can move over time relative to the receivers. There is a need for a system to track the position of the transmission sources as they move over time.

SUMMARY

The systems, methods, and devices described herein each have several aspects, no single one of which is solely responsible for its desirable attributes. Without limiting the scope of this disclosure, several non-limiting features will now be described briefly.

Embodiments of the present disclosure relate to apparatuses and methods for tracking of user movements against a timeline.

In some aspect, a system for tracking position of a moving transmission source, the system comprises a first transmission source configured to transmit a first signal while moving from a first position to a first expected position; a receiver configured to receive the transmitted first signal; an audio source configured to transmit an audio signal at a predetermined frequency; and a controller configured to electronically couple with the receiver; the controller is further configured to: determine a second position of the first transmission source in a field based on the received first signal; calculate a first location offset between the second position of the first transmission source with the first expected position of the first transmission source, the first expected position stored in a first data repository; compare the first location offset with a predetermined threshold; calculate a first rate of movement of the first transmission source from the first position to the second position of the first transmission source, wherein the first rate of movement is calculated based on a distance traveled between the first position and the second position of the first transmission source with respect to the predetermined frequency; and transmit a first indication to at least one user device based on the comparison of the first location offset with the predetermined threshold, wherein the first indication comprises the calculated first rate of movement.

The apparatus of the preceding paragraph may also include any combination of the following features described in this paragraph, among others described herein. In some embodiments, the controller is further configured to construct a user interface for display, the user interface comprising: a graphical depiction of the field; a first indicia with respect to the graphical depiction of the field indicating the first expected position; and a second indicia with respect to the graphical depiction of the field indicating the determined second position; wherein the second indicia includes a display characteristic, wherein the display characteristic is a function of the first location offset and wherein the display characteristic comprises at least one of the following: a color, a symbol, an image, and a pattern. In some embodiments, the first expected position comprises a first arrival timestamp, wherein the first arrival timestamp is calculated based on a predetermined value and distance between the first expected position and a position of the audio source. In some embodiments, the system can further comprise: a second transmission source, wherein the second transmission source is configured to transmit a second signal while moving from a third position to a second expected position; and the receiver configured to receive the transmitted second signal; wherein the controller is further configured to: determine a fourth position in the field based on the received second signal; calculate a second location offset between the fourth position with the second expected position of the second transmission source, the second expected position stored in a second data repository; compare the second location offset with the predetermined threshold; calculate a second rate of movement of the second transmission source from the third position to the fourth position, wherein the second rate of movement is calculated based on a distance traveled between the third position and the fourth position of the second transmission source with respect to the predetermined frequency; and transmit a second indication to at least one user device based on the comparison of the second location offset with the predetermined threshold, wherein the second indication comprised the second calculated rate of movement. In some embodiments, the controller is further configured to construct a user interface for display, the user interface comprising: a graphical depiction of the field; a first indicia with respect to the graphical depiction of the field indicating the first expected position; and a second indicia with respect to the graphical depiction of the field indicating the determined second position; a third indicia with respect to the graphical depiction of the field indicating the second expected position; and a fourth indicia with respect to the graphical depiction of the field indicating the determined fourth position; wherein the second indicia includes a first display characteristic, wherein the first display characteristic is a function of the first location offset; wherein the fourth indicia includes a second display characteristic, wherein the second display characteristic is a function of the second location offset; and wherein the first and second display characteristics comprises at least one of the following: a color, a symbol, an image, and a pattern. In some embodiments, the second expected position comprises a second arrival timestamp, wherein the second arrival timestamp is calculated based on a predetermined value and distance between the second expected position and a position of the audio source. In some embodiments, the controller is further configured to construct a user interface for display, the user interface comprising: a list, the list comprising: a first entry corresponding to the first expected position; a second entry corresponding to the second position, and at least one indicia comprising at least one display characteristic, wherein the at least one display characteristic is a function of the first location offset; wherein the at least one display characteristic comprises at least one of the following: a color, a symbol, an image, and a pattern. In some embodiments, the user device comprises at least one of the following: a mobile device; a personal computer; and a tablet. In some embodiments, the transmission source comprises at least one of the following: a mobile device; a tablet; an earpiece; and a body antenna. In some embodiments, the predetermined frequency is measured in beats per minute.

In some aspect, a method for tracking position of a moving transmission source, the method comprising: transmitting a first signal from a first transmission source while moving from a first position to a first expected position;

receiving the transmitted first signal by a receiver; transmitting an audio signal at a predetermined frequency from an audio source; and electrically coupling a controller with the receiver; determining a second position of the first transmission source in a field based on the received first signal; calculating a first location offset between the second position of the first transmission source with the first expected position of the first transmission source, the first expected position stored in a first data repository; comparing the first location offset with a predetermined threshold; calculating a first rate of movement of the first transmission source from the first position to the second position of the first transmission source, wherein the first rate of movement is calculated based on a distance traveled between the first position and the second position of the first transmission source with respect to the predetermined frequency; and transmitting a first indication to at least one user device based on the comparison of the first location offset with the predetermined threshold, wherein the indication comprised the calculated first rate of movement.

The apparatus of the preceding paragraph may also include any combination of the following features described in this paragraph, among others described herein. In some embodiments, the method further comprising: constructing a user interface for display; displaying a graphical depiction of the field, the graphical depiction comprising: a first indicia with respect to the graphical depiction of the field indicating the first expected position of the user; and a second indicia with respect to the graphical depiction of the field indicating the determined second position; wherein the second indicia includes a display characteristic, wherein the display characteristic is a function of the first location offset and wherein the display characteristic comprises at least one of the following: a color, a symbol, an image, and a pattern. In some embodiments, the first expected position comprises a first arrival timestamp, wherein the first arrival timestamp is calculated based on a predetermined value and distance between the first expected position and a position of the audible time source.

BRIEF DESCRIPTION OF THE DRAWINGS

Embodiments of the present disclosure will now be described hereinafter, by way of example only, with reference to the accompanying drawings in which:

FIG. 5 illustrates an embodiment of a coordinate card;

FIG. 11 illustrates an embodiment of a show timeline based on beats per minute, and events that correspond to the each beat;

FIG. 14 illustrates an embodiment of databases and the data stored in the databases;

FIG. 17B illustrates an embodiment of an audible time source and an offset of a device location;

FIG. 24 illustrates an embodiment of a location feedback for an individual in the form of a list;

FIG. 29 illustrates an embodiment of a location feedback for a group in the form of overlay.

DETAILED DESCRIPTION

Figure 1:
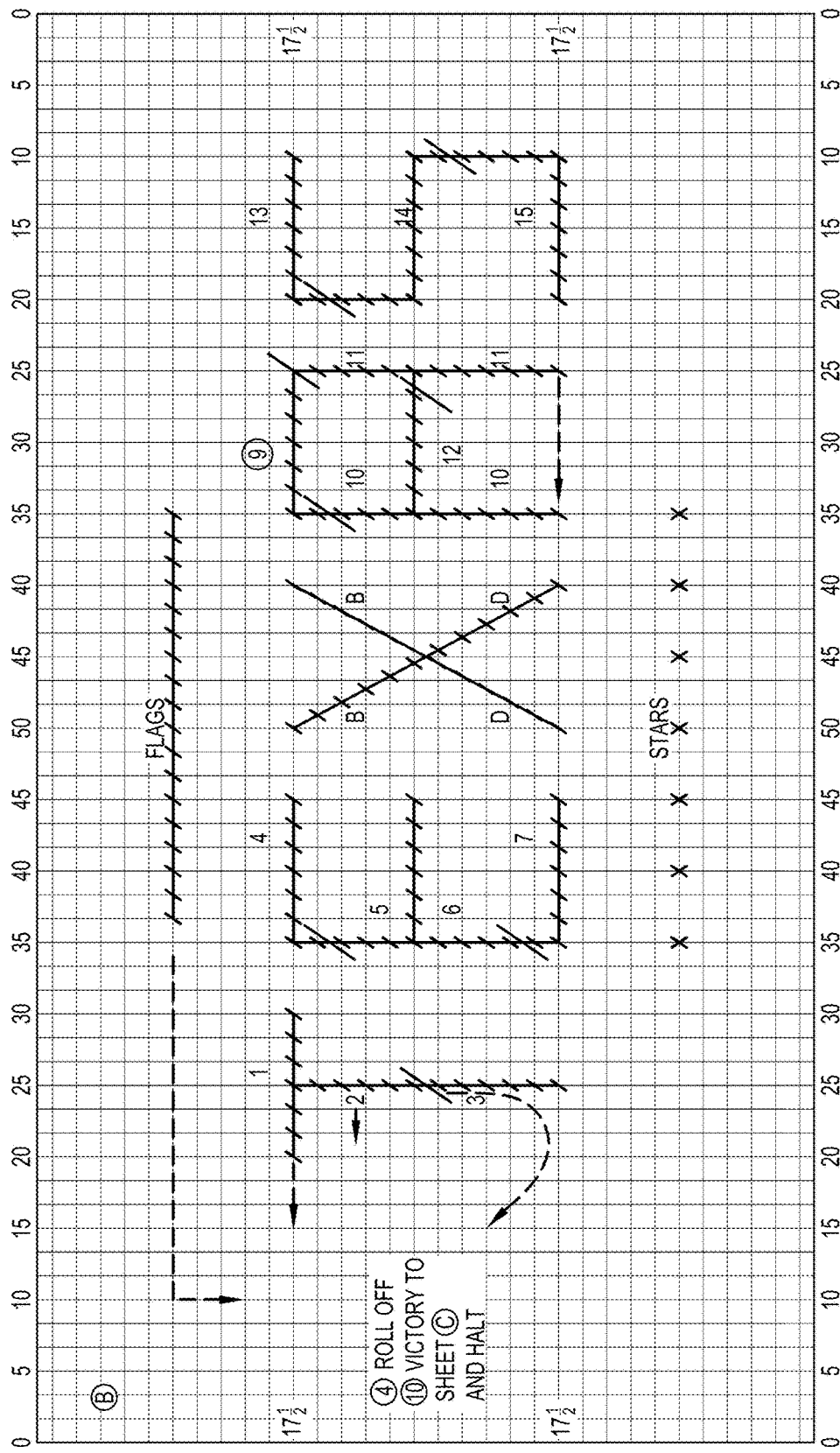
FIG. 1 illustrates an embodiment of a hand sketched marching band drill.

Embodiments disclosed herein relate to systems and methods of teaching and learning drills of a marching band. The system and methods described herein can include a location tracking system that can be used for tracking a plurality of devices against a sequence of expected locations against a timeline. In some embodiments, the locations are tracked with respect to an audio transmission or standard audio source for use in drill learning for marching bands. The systems and methods described herein can be used to streamline the learning process by providing accurate and easy to read feedback to a single user or multiple users. As used herein, the terms location and position may be used interchangeably and can be an absolute or relative with respect to a reference point.

As used herein, drill is a broad term and has its ordinary meaning and also includes without limitations using the plural "drill" is the common vernacular to refer to multiple sets and travel time between sets. "A drill," to someone familiar in the art, can refer to a single set without the travel time to and away from said set.

As used herein, an audible time source includes a device to provide an audible, uniform pulse. An example of an audible time source can include devices such as, but is not limited to, a metronome operating out of a loudspeaker, an in ear metronome, a midi recording of music being played through in-ear monitors, a conductor visually displaying time through arm gestures, or any other audible, visual, and/or haptic cue which uniformly and predictably subdivides time.

As used herein, an event can include any occurrence taking place within the context of a marching band show. Examples of events can be, but are not limited to, a step, a note being played, a color guard member tossing a flag, a turn, a participant standing still, and/or a participant arriving at a location.

As used herein, a movement command sequence can be a count off to inform users when movement should begin. The movement command sequence can be provided from the time source and can be auditory, visual, and/or haptic sensation. For example, a movement command sequence can be, but is not limited to, eight evenly subdivided pulses from a backfield metronome amplified out of a loudspeaker.

As used herein, a perpetual timeline can include a time base. In some embodiments, the perpetual timeline can be based on a wall clock and used to track and easily categorizes activities taking place within a scope of work being observed and analyzed.

In some embodiments, a precision time protocol can be used. The precision time protocol can be used in a timecode controller, as described in more detail herein, to synchronize all devices to within 1 millisecond of the main server's perpetual timeline as the distance between users and network access points is in flux.

In some embodiments, a time delay protocol can be used. The time delay protocol can be used to monitor the location of the audible time source in relation to each participant. The participants' distance from the audible time source can be used to ensure the time delay of sound is accurately calculated in the show timeline as described in more detail herein. In some embodiments, the time delay protocol can provide the offset or time delay by adjusting the event timing, as it related to the timecode, with a time offset amount (audible time source timecode+participant millisecond offset).

As used herein, the show timeline can be the time base used in the system to establish when events are expected to occur as well as the length of time events are expected to take to unfold. For example, the show timeline can include a piece of music, a wall clock, a metronome, aggregate data of uniform movement, and/or a beats per minute time table.

The process by which marching bands learn a show has evolved very slowly over the past few decades. There is a need for a system to streamline the learning process for teaching and learning drills for marching bands by providing feedback to the user. Marching band drill is sketched out by hand as illustrated in FIG. 1. Instructors would provide individual marchers with the full picture. The individual had the responsibility of finding their single spot within the picture and placing themselves in the correct location on the field. This pen to paper approach offered no playback option to check for error and often led to correcting problems when the idea on paper was executed by moving individuals. This process was very time consuming for both the person writing the drill and those responsible for leaning what was written. Pyware 3D provides a drill writing software for writing drills. The drill can be played, altered, edited, and checked for errors. While the process for writing drill has evolved, since 1994 the archaic process for learning drill, which is described in detail below, has not.

To begin the drill writing process, the drill writer first establishes a timeline for the drill. The timeline is derived by the music to which the drill corresponds. The total number of beats within the music determines the total length of the timeline. Therefore, a piece of music containing 400 beats has a corresponding drill with a 400 beat timeline.

Figure 2:
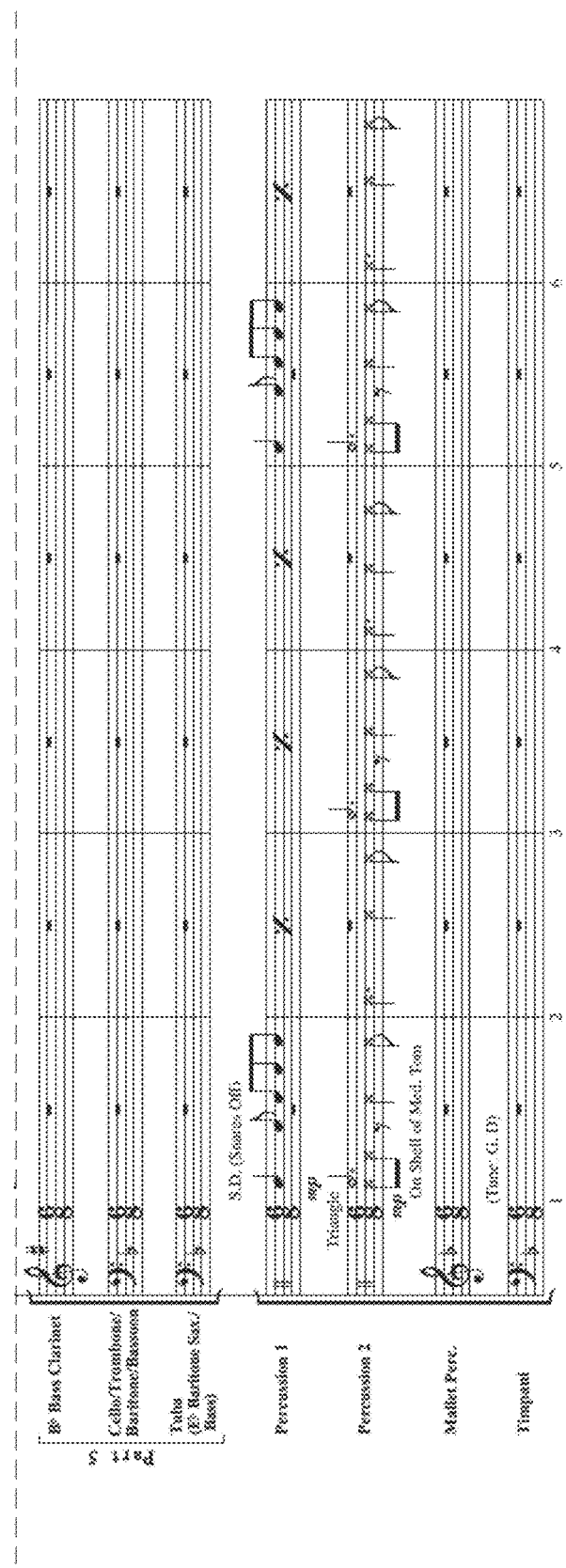
FIG. 2 illustrates an embodiment of a subdivided timeline based on music with assigned page tabs, or set numbers, to specific counts in the music.

Once the full time base is established, the drill writer subdivides the timeline and assigns page tabs, or set numbers, to specific counts in the music where drill logically flows. For instance, set 1 begins at the beginning of the music. So, set 1, or page tab 1, can be added at count zero of the show timeline as shown in FIG. 2. The move from set 1 to set 2 is 4 counts of music. So the page tab for set 2 can be added at count 4 of the timeline. This process continues for the entirety of the show, which is typically between 60 to 100 sets of drill for a typical show.

Figure 3:
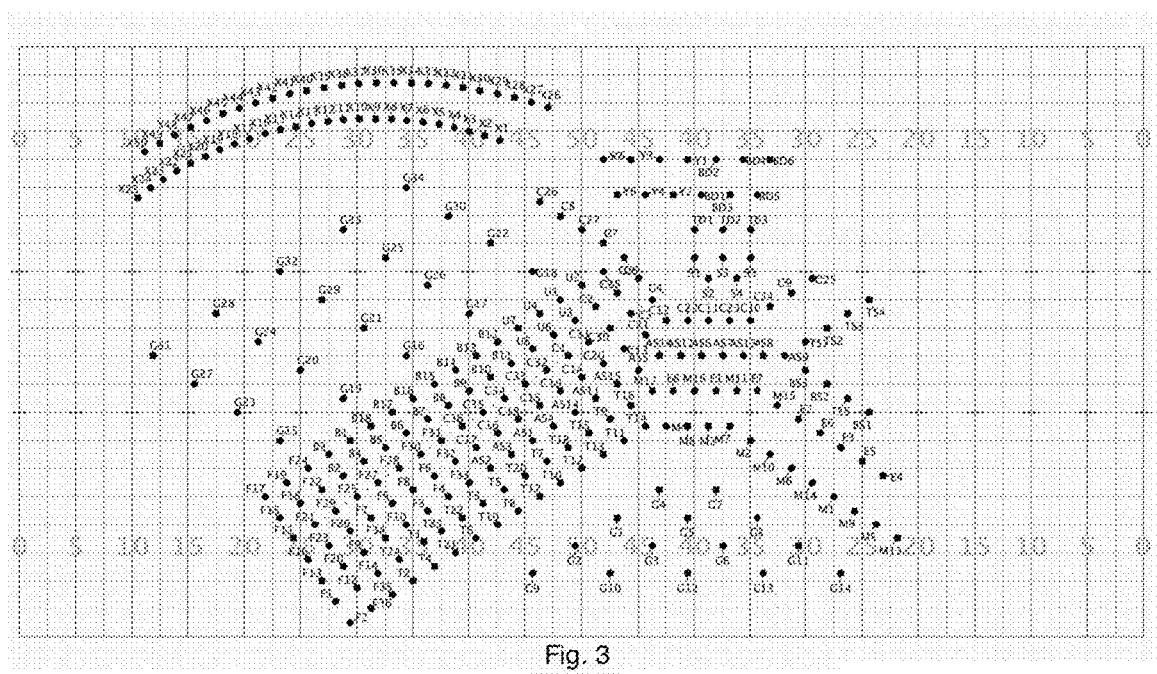
FIG. 3 illustrates an embodiment of designs of the pictures created by the drill writer, referred to as forms or sets, which can appear on the field.

Once the count structure of the timeline has been established, the drill writer designs the pictures, commonly referred to as forms or sets, which can appear on the field as shown in FIG. 3. Each set on the timeline has a corresponding picture. Set one may be a square, set 2 a parallelogram, and set 3 a triangle. Typically the flow of sets will first be sketched out like a movie storyboard. Once the flow of sets is acceptable, the drill writer will begin formally drawing each set on the football field.

Figure 4:
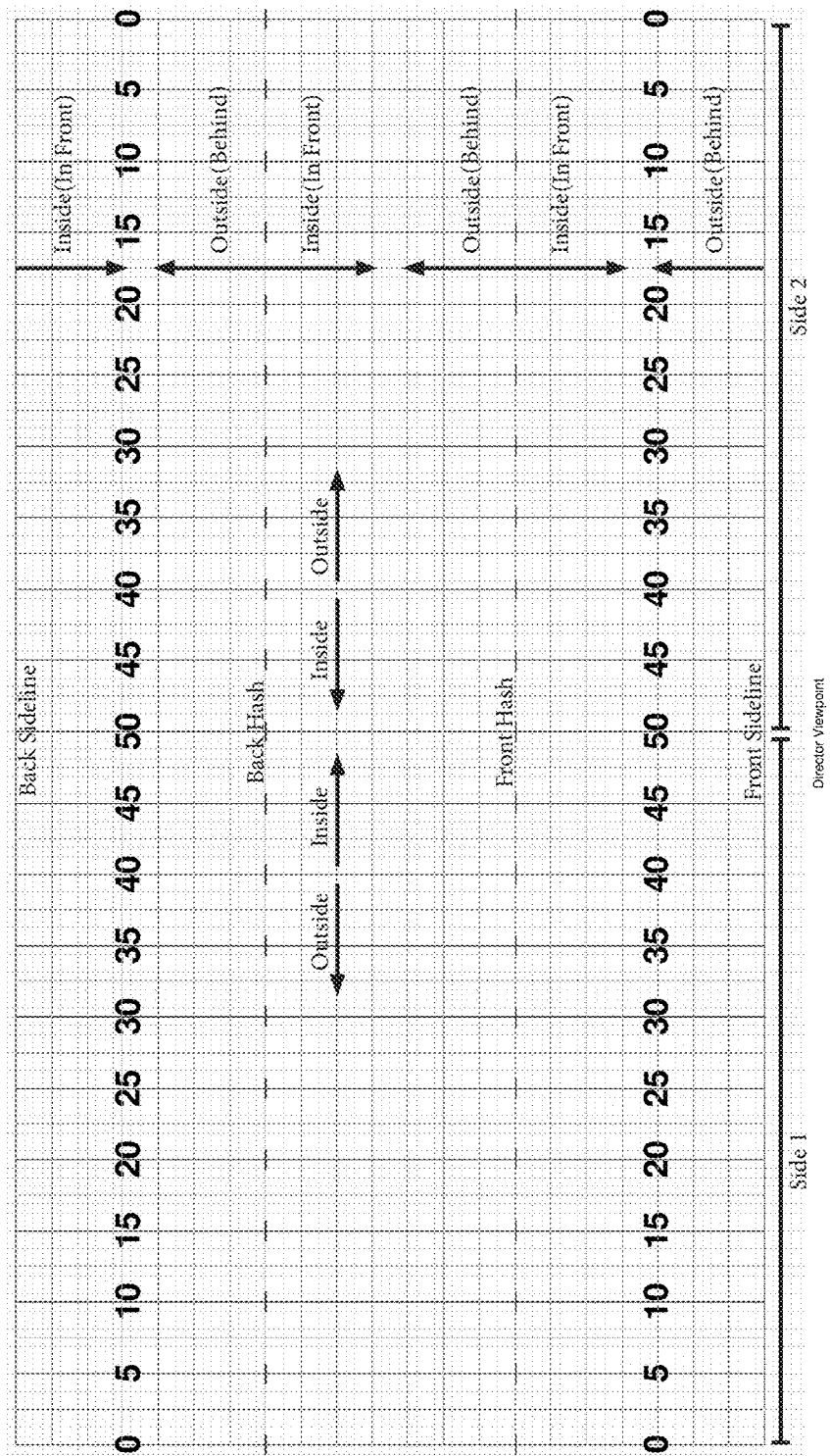
FIG. 4 illustrates a four by four grid.

Drill writing simulation can subdivide a football field into a grid, known commonly to those familiar in the art as a four by four grid. FIG. 4 illustrates the four by four grid. The term "four by four" refers to the number of steps between each line as shown in FIG. 4. The default marching band step size is referred to as "eight to five," or eight even steps between each yard line. For example, the eight to five is a 22.5-inch step. Each line on the grid is four, eight to five (22.5") steps apart. The four by four grid can be subdivided down even further to determine the exact location of a student or individual in a form. The grid is designed to shrink the size of the field to make it easier for a student or individual to find their exact location for any given set. Drill writers use this four by four grid as their canvas to draw forms on the field. As used herein, the student or marcher can be used as an example of any individual that is learning a drill.

In addition to designing each set, the drill writer is also responsible for checking the movement between sets. Ideally students will be able to move from set to set without collision, obstruction, or difficulty. Drill most commonly moves from point to point in a straight-line path, so with proper planning, this step is quick. Plus the playback feature in modern drill writing software requires very little effort for checking pathways. However, a common problem is requiring students to take too large a step from set to set. So, while the path may be unencumbered, the time versus distance ratio does not play to the students favor. Once all sets and movement between sets is complete and satisfactory, the drill writer then produces images of the overhead view of the drill for the institutional staff and coordinate cards for the students and the learning process can then begin.

The big picture or overhead view of the forms is the reference point of accuracy for the director in the press box and any supplemental staff on the field. FIG. 3 illustrates an embodiment of this big picture or overhead view. As the students learn their drill, the director in the press box uses the full field view to double check his or her student's work. A common practice for learning a drill is to have all the students find a specific form and stand in place while the director checks each individual one at a time. The problem with this approach is the director is commonly a hundred feet away from the field in a press box giving location instructions down to the quarter inch. Additionally, one person checking the work of a hundred other individuals is not an efficient use of time. Human error and poor time management are major issues in this process, two problems a location system as described herein can correct.

In addition to providing a full field view of the drill, the locations for an individual and compilation of all their sets may be stored in a database by a drill simulation system and may also be provided in a coordinate card format as shown in FIG. 5. Within each form, individual marchers are assigned a very specific role. The descriptions of each individual's responsibilities within the big picture are articulated through their coordinate cards as shown in FIG. 5. The coordinate card provides the student or individual with a detailed list of locations and the exact moments on the timeline to which the locations correspond. The process for finding a single location on the field and how to move from location to location is a very tedious and convoluted process riddled with human error. The location system described herein can address these issues.

Finding the individuals' location for a set is similar to finding a location on a map using longitude and latitude. The coordinate card breaks the field into its end zone-to-end zone orientation (Side-to-Side), as well as the sideline-to-sideline orientation (Front-to-Back). The first column of the coordinate card gives the student information on the set number and when the set occurs on the timeline, the next column provides directions for their Side-to-Side location, and the last column their Front-to-Back as shown in FIG. 5.

The side-to-side location begins from an easily defined, visible, and fixed reference point, yard lines and goal lines. The coordinate card then references how many steps the student should be from the visible reference point. The number of steps listed refers to an "eight to five" step size. So, a student may be instructed to stand 2.5 steps from the 40-yard line. This would indicate the student should stand 2.5 "eight to five" steps or 56.25" from the 40-yard line. Furthermore, the coordinate card indicates if the location is inside the field, towards the 50-yard line, or outside the field, away from the 50-yard line as illustrated in FIG. 4. So the same coordinate of 2.5 steps from the 40-yard line actually reads, 2.5 steps inside the 40 yard line. This further indicates the student should stand 2.5 "eight to five" steps or 56.25" from the 40-yard line on the side of the yard line closest to the 50-yard line.

To complicate matters even further, the coordinate card specifies the side of the field the student is to stand on. Since every football field has two of every yard line, except the 50, the student needs to know which 40-yard line he or she needs to start from. The 50-yard line divides the sides of the field. Side 1 refers to the left side of the field as viewed from the press box, and side 2 is the right side as illustrated in FIG. 4. For example, the same coordinate described above can appear as follows on a coordinate card:

1: 2.5 steps inside 40 yd ln

This notation tells the student to start on the 40-yard line on side 1 of the field. They should then stand 2.5 "eight to five" steps or 56.25-inches from the yard line on the side of the yard line closest to the 50. This is a very confusing and complicated process and this is only half of the process that is used.

The student then finds their front-to-back location. Again, like the side-to-side location, the front-to-back position is determined by referencing a fixed position, sidelines and hash marks (FIG. 4). The coordinate card indicates the distance a student should stand from a fixed position. For instance, 12 steps from the front sideline indicates 12 "eight to five" steps or 270-inches away from the front sideline, the front sideline being the sideline closest to the press box. Additionally, the coordinate card indicates "in front of" or "behind" the fixed position reference point as illustrated in FIG. 4. For example, the front-to-back coordinate can appear as follows:

12 steps behind front sideline

Figure 6:
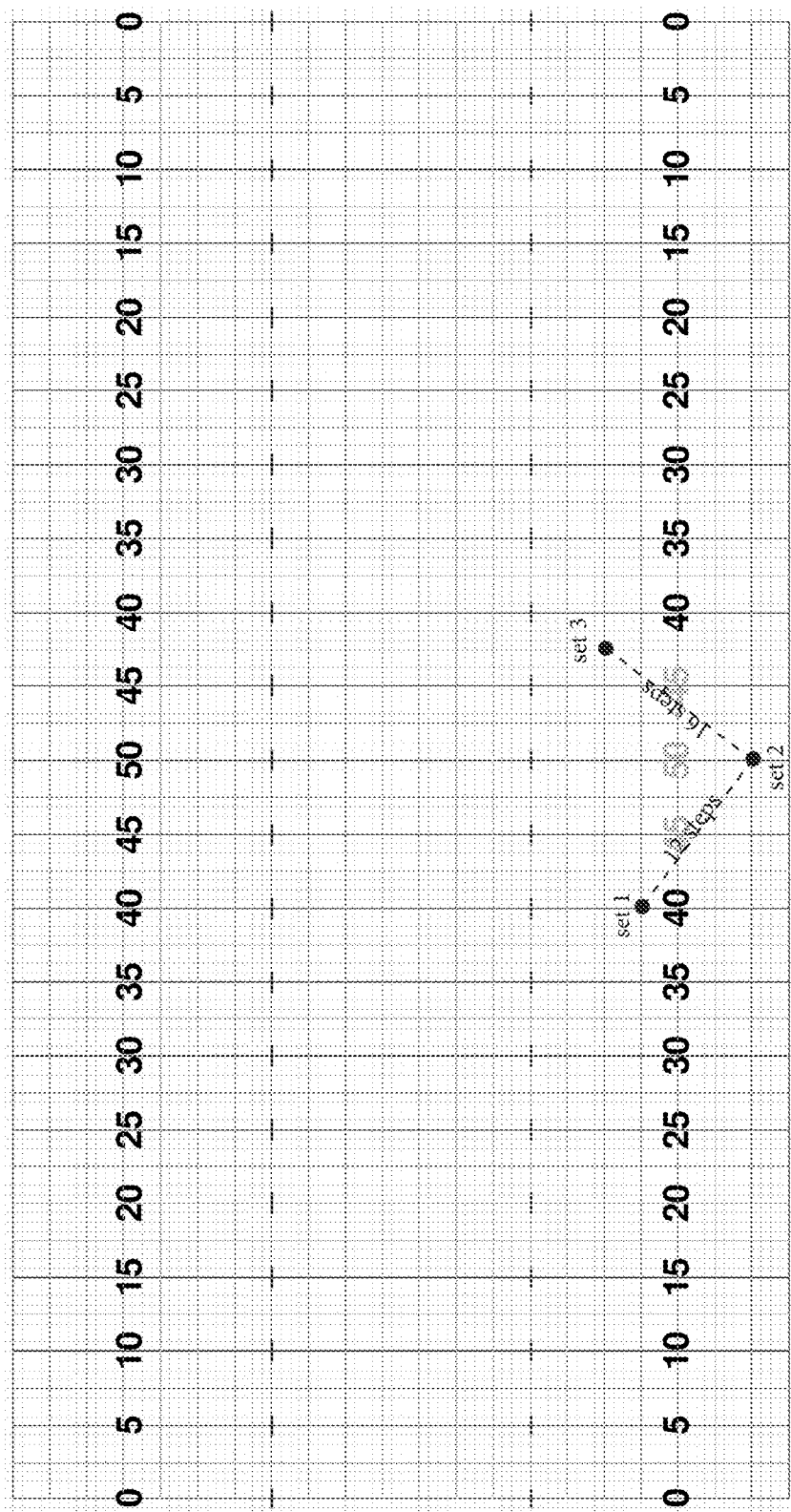
FIG. 6 illustrates an example of executed steps from one coordinate to the next.

The marcher is then responsible for learning both the path and travel time between sets. The timeline, which indicates travel time, is conveyed to the individual marcher on their coordinate card under the column titled "move" as shown in FIG. 5. The starting position of the drill is indicated with "move" equaling zero. Each number thereafter corresponds to the number of musical counts the marcher is allowed to arrive at the corresponding coordinate. The number of counts in the timeline also tells the marcher the number of steps allowed to complete the move. If the move is 12 counts, the marcher is expected to execute 12 even sized steps from one coordinate to the next in a straight-line path as shown in FIG. 6. The variables of even sized steps and straight-line path are two more examples of human error the system described herein can address.

The final element in learning and executing drill is having all marchers travel through the timeline from set to set at the same rate. In order to achieve this each individual marcher is required to keep his or her feet moving in exact alignment with the timeline. Therefore, if the timeline is moving at 160 beats per minute, each marcher needs to move their feet at 160 beats per minute. This adds another layer of difficulty in execution for the student and one extra element the teaching staff may need to address with a multitude of students.

A high understanding of location, travel time, path, and foot timing should be displayed at the individual level in order for the drill to be clean and readable on the field. Inefficiencies in the learning process occur with the lack of qualified staff members available to correct individual deficiencies and the lack of funds to hire enough staff to have an adequate teacher to student ratio. Therefore, the current methods for teaching and learning drill, which can include, but not be limited to, feedback related to location of individuals on the field, path from location to location, travel time between locations, and body orientation for hundreds of students, has many built in problems.

The process of learning drill is very tedious and time consuming. There are many inherent problems with the current process by which marching bands learn drill. Human error is one of the main problems. The process also heavily relies on a group of students, sometimes two to four hundred in number, to be very accurate in locating their drill coordinates down to the quarter inch. To do this their eight to five step size should be immaculate. In addition to knowing each location on the field, the students should be capable of traveling from set to set in a predetermined number of even size steps in a straight line path. Finally, the students should know the direction to face, when to turn around, and when and where to move their instrument, all while playing music. Add in the fact that the group of four hundred students (sometimes between the ages of 15 to 18) and it can be understood that there can be a high level of inaccuracy across repetitions. For example, even when students have performed a section of the show and/or drill approximately 200 times over the course of six weeks there can still be many problems and errors that occur in the performance. As is evident, problems with spacing between students, where and when to turn, where and when to move, stop, and change direction, and what path to take are still major issues at the individual level. In addition, big picture forms can still be unreadable and unclear because of inaccuracies in individual location knowledge.

The previously described also relies heavily on the director and staff to be able to eyeball the many inaccuracies of the students and to be able to verbally articulate the viewed mistakes. Improvement can be seen in a marching band show when feedback can be given to as many students as possible at one time and this can make the most effective use of rehearsal time. Typically a band has 3 to 7 staff members present to give feedback. Even if each staff member can address 5 students at a time, the majority of the band gets little to no feedback after executing a section of their production. Providing accurate feedback to multiple students that addresses location accuracy, step size accuracy, and path from location to location to as many students as possible could provide increased efficiency and accuracy to the drill learning process.

Figure 7:
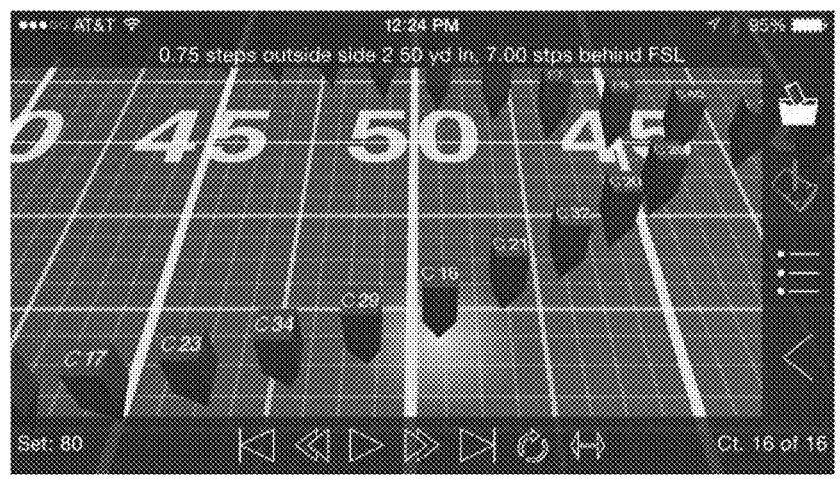
FIG. 7 illustrates an embodiment of a display of a drill and drill moves.

Mobile devices or other location tracking mechanisms can be used to track user locations and those user locations can be used to assist in the way a drill is learned and/or performed. The ability to track the user location can address issues that arise in the current learning model. In some embodiments, mobile device, personal computer, tablet, and/or any other computing device can be utilized as a user device as described herein. For example, a simulation can be used to present digital coordinate information to the individual as well as a visual reference of how their individual location fits within the big picture as illustrated in FIG. 7. The simulation can also show how the drill moves from one set to the next. However, the simulation provides information of what the individual student should do. It can be useful to also provide feedback or information to the user about what the individual student did or is doing. The location tracking system as described herein can provide the information that shows what the individual students should do, and overlays that expected positioning and information with what the individual actually did (the actual movements and positioning). In one embodiment, the feedback or information provided to the user about what one or more individual student or users did or are doing can be provided in real time and/or substantially instantaneously. In some embodiments, real time and/or substantially instantaneously as used herein can mean in less than 30 seconds, less than 20 seconds, less than 5 seconds, less than 1 second, and/or less than 1 millisecond. In some embodiments, these expected and actual movements can be tracked with relation to an audible time source as described herein. In some embodiments, the information of the movements actually performed by the individual and/or individuals can be provided separately. The location system as described herein can compare the two data points (expected movements vs actual movements) for accuracy. The system can address location accuracy, step size accuracy, and path from location to location, for the multiple individuals, and provide corrections and/or improvements to the users (e.g., students and/or instructors) that can correct errors.

The location system for tracking a plurality of devices against a timeline is a location platform that can provide substantially instantaneous information to the user for increasing efficiency and efficacy of movement feedback by providing reliable and empirical data to the end user. In some embodiments, substantially instantaneous information as used herein can include information communicated to the device in less than 30 seconds, less than 20 seconds, less than 5 seconds, less than 1 second, and/or less than 1 millisecond. In some embodiments, the feedback can be stored in the system and provided to the user at a later time. Feedback can be generated by comparing users actual location against their predetermined or expected location against a timeline. Feedback can include a characteristic of an audible time source. Characteristic can include beats per minute or frequency or like. Comparing can include analyzing the accuracy of the user's movement against a predetermined degree of accuracy.

System Users

The system users can include administrators of the system and active users in the system. The administrators of the system can include designers and managers. The designers can be the individuals who design the series of predetermined events being executed by others. The managers can include individuals whose responsibilities are those of a teacher or other administrator and/or director of the show. The managers are responsible for operating the system and creating preset expectations for others to execute. An example of a manager is, but is not limited to, a marching band director. The active users of the system can include participants. The participants are the individuals' responsible for executing the series of events created by the designer. An example of a participant is, but is not limited to, a student in a high school or college marching band.

The system includes drill writing technology and a process that allows the devices operating in a network to interpret and analyze proximity data. The system output can be to provide the user with feedback to increase the accuracy of their execution of events such as, but not limited to, predetermined location placement, travel time, and route from location to location. The system can provide specific feedback information relevant to both managers and participants within the network.

Design technologies, such as but not limited to Pyware 3D, Field Artist, or EnVision, can be used within the system to allow a designer to develop a sequence of predetermined locations or events. These events consist of unique locations and events occurring within an interactive field. The interactive field can be, but is not limited to, a gymnasium floor, or a football field. An event in the field can be any occurrence taking place within the context of a marching band show. Examples of events are, but are not limited to a step, a note being played, a color guard member tossing a flag, a turn, a participant standing still, or a participant arriving at a location. The number of events occurring within the sequence can be of infinite number and the series of events can be expected to follow the same sequence. The tracking of a participant's movement through the predetermined sequence of events, which was laid out in the design software, can be compared and analyzed against the user's actual location placement.

The location design technology supplies the end user with the sequence of events that should occur as well as when said event should occur on a timeline. The system can provide the end-user location analytics to determine the participant's accuracy in their execution. This data can be achieved through the use of location technology. The system can couple the design technology with micro-location information to provide feedback to the users.

Micro-location technology can be used to track the user and user device. For example, micro-location technology can include a low energy blue tooth device including those currently found in mobile devices such as but not limited to Eddystone in Android devices and iBeacon in Apple devices. In some embodiments, the user or device can be tracked with other devices such as body antennas or beacons manufactured by companies such as Estimote, Blue Sense, Radius Networks, Kontact io or Blue Cat. The location system described herein allows the end user to compare what occurred against what should have occurred and provide empirical data to make the two data points align.

Stationary Beacons

Figure 8:
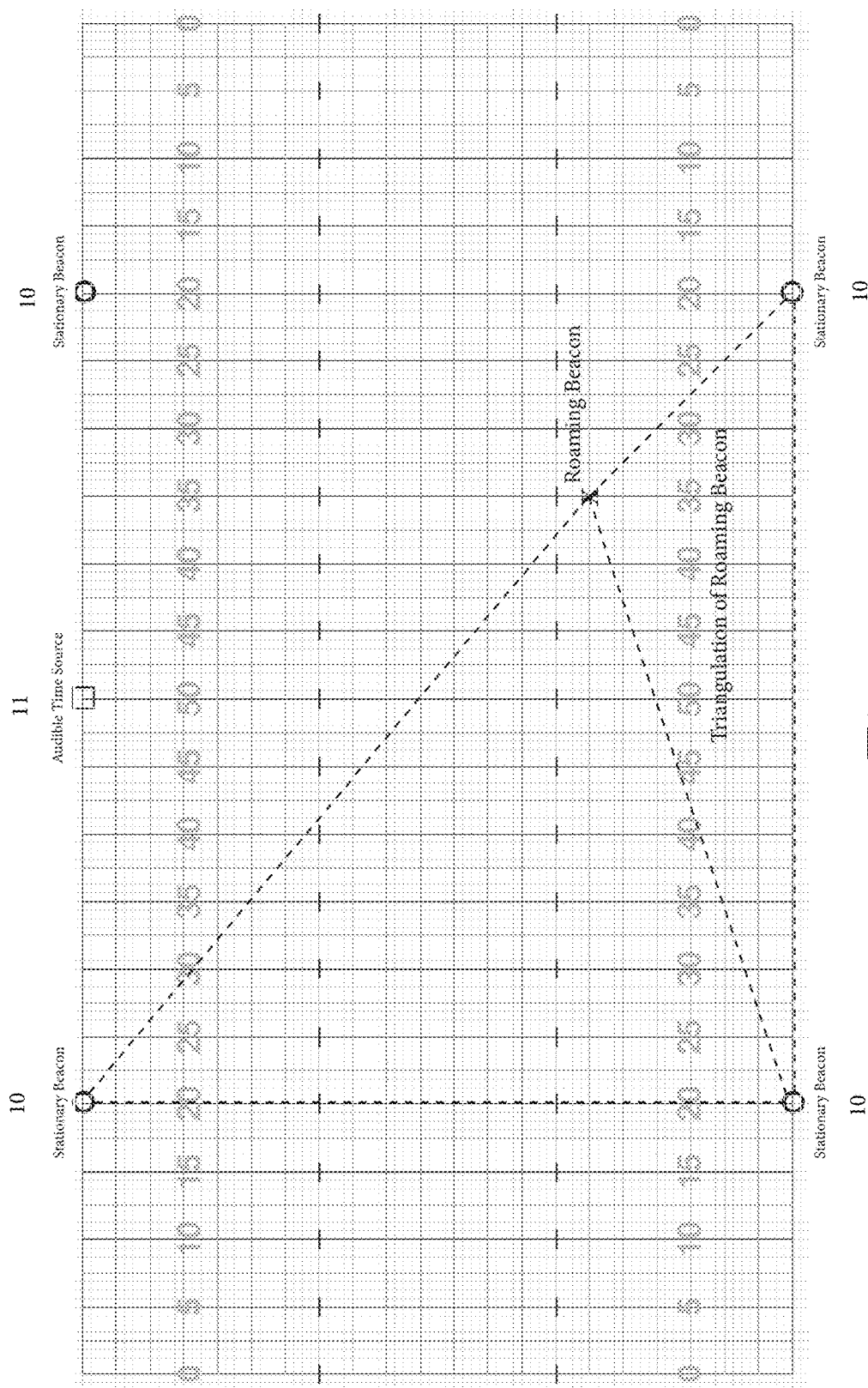
FIG. 8 illustrates an embodiment of a location of stationary beacons used to build the dimensions of the interactive field and triangulate user movement, a roaming beacon having its location triangulated by the stationary beacons, and the location of a time source.

Physical hardware is deployed to build an interactive field in which users can be tracked. In some embodiments, the hardware can be a fixed position micro-location beacons or stationary beacons such as, but not limited to Radius Networks RadBeacon X4, Quuppa LD-L7, or Kontakt BeaconPro 10. The fixed position or stationary beacons 10 at pre-determined locations can establish the physical space in which the users' devices operate as illustrated in FIG. 8. These stationary beacons 10, of unlimited number depending on the total size of the interactive field but no less than two, can triangulate the user's position in order to provide the most accurate location data possible. The tracking of individuals within the interactive field created by the stationary beacons may improve accuracy. In some embodiments, the location information of devices in the system can be accurate from one meter down to as fine as 5 cm. in some embodiments, the location information of the device can be accurate to less than 5 cm. Additionally, the individuals operating in the field can be tracked at speeds ranging from a walk to a run. In some embodiments, in order to achieve tracking data without latency, the transmission rate of the stationary beacons can be able to track at half second intervals with someone moving at up or equal to 10 feet per second. In some embodiments, the transmission rate of the stationary beacons can be able to track at 5 second intervals, 1 second intervals, ½ second intervals, ¼ second intervals, and/or less than ¼ second intervals.

Participant Beacons/Roaming Device

In some embodiments, all participants wear a tracking beacon, also referred to as "roaming beacon" herein. FIG. 8 illustrates a positioning of a roaming beacon marked as an "X". FIG. 8 illustrates an embodiment of the roaming beacon X with relation to the stationary beacons 10 and audible time source 11. These roaming beacons can be, but are not limited to, micro location beacons found within smart devices or external beacons designed specifically for tracking movement as described herein. In some embodiments, the transmission rate of the roaming beacons can be able to track at half second intervals with someone moving at up to 10 feet per second. The roaming beacons, worn by participants in the interactive field, can be tracked by triangulating their position in relation to the stationary beacons 10 as illustrated in FIG. 8. In some embodiments, the tracking beacon or roaming beacon can be the user device as described herein. In other embodiments, the tracking beacon or roaming beacon can be a different mechanism or device than the user device that is associated with the user or participant. In some embodiment, the individual or user can be tracked by a signal sent from a transmission source or tracking beacon on their person or nearby. In some embodiment, the user movement can be tracked by an accelerometer or other device for tracking motion.

Other Devices

Other physical hardware operating in the network can be, but is not limited to, network access points, servers, smart phones and tablets for user interface, metronomes acting as time sources, and video cameras to be used for movement capture and analytical overlay.

In some embodiments, a user may poses a device on their person which encompasses or talks to the local location beacon for that user, communicates with the necessary controllers for registration, show, and performance, collects information, has a screen to provide feedback regarding the most recent performance, and the users location card as is described in more detail herein. The device may have additional features such as an accelerometer, audio output to provide a click for time or audio feedback regarding the user's relative location in relation to where they should be. This device can be software and additional hardware within a preexisting smart phone.

The system described herein can provide analytics for expected movement against actual movement. The computing environment can include timelines for monitoring and categorizing events, time sources, personnel databases, databases for uploading and distributing events, communication protocol, and a user interface for managers and participants.

Timelines

Figure 9:
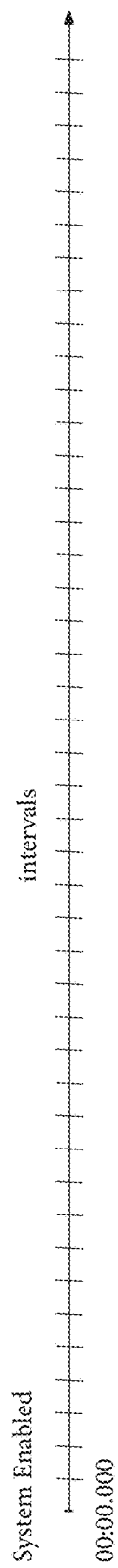
FIG. 9 illustrates an embodiment of a perpetual timeline.

The system can include two timelines, a perpetual timeline and a show timeline. FIG. 9 illustrates an embodiment of a perpetual timeline. The perpetual timeline also referred to as the "rehearsal timeline" can be based on a wall clock and used to track and easily categorize activities taking place within a scope of work being observed and analyzed. The perpetual timeline can begin and the system is enabled at 0:00.000 and continue until the system manager ends the session as illustrated in FIG. 9. In some embodiments, the perpetual timeline can continue to run in perpetuity until the network is shut down. In some embodiments, the perpetual timeline can be incremented in millisecond intervals. In other embodiments, the perpetual timeline can be incremented in second, decisecond, centisecond, millisecond, microsecond, and/or nanosecond intervals.

For example, the perpetual timeline could be used to monitor a full school day beginning with the first school bell at 8:30:00 am, triggering the perpetual timeline to start at 00:00:00.000, and ending with the last bell at 4:15:00 pm, or 07:45:00.000 on the perpetual timeline. This perpetual timeline allows all school participants (administrators, teachers, parents, and students) to easily monitor when events, such as classes, lunch, and student conduct issues occur throughout the school day.

The perpetual timeline can begin when the system is enabled as illustrated in FIG. 9. The length of the perpetual timeline can run in perpetuity until the system manager shuts down the network. In some embodiments, the perpetual timeline can be accurate down to a millisecond interval. The purpose of the perpetual timeline is to serve as the master timeline to chronicle events. The devices operating in the network can be synchronized to the perpetual timeline using a protocol such as a precision time protocol.

A marching band rehearsal is used herein as an example for how the perpetual timeline is incorporated.

At the beginning of a marching band rehearsal, the system manager can enable the system. This action begins the perpetual timeline. This timeline can be used for the system to chronicle the events taking place within the marching band rehearsal, which can be reviewed by the systems managers and participants. The perpetual timeline can continue to run for as long as a rehearsal lasts and end when the system manager shuts down the network.

The system can utilize a second timeline. The second timeline is referred to herein as the show timeline. The show timeline, which can be based on, but not limited to, a piece of music, a wall clock, a metronome, aggregate data of uniform movement, or any other medium by which time can be subdivided into uniform and predictable parts, can be used in the system to establish when events occur as well as the length of time events take to unfold. The total length of the show timeline is limitless and may include negative time.

Figure 10:
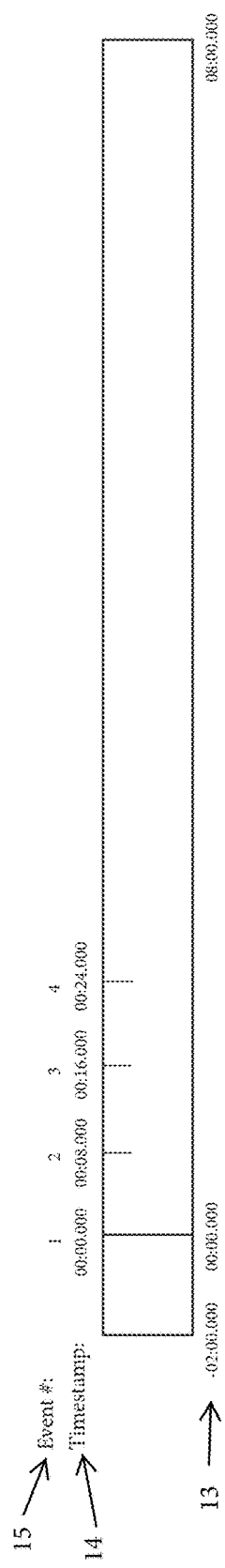
FIG. 10 illustrates an embodiment of a show timeline and time stamps.

The show timeline can be the time base on which the predetermined, chronological sequence of events is outlined as illustrated in FIG. 2 and FIG. 10. FIG. 10 illustrates an embodiment of a show timeline 13 and time stamps 14 for each event 15. A time stamp for each event in the sequence is assigned along this timeline. In some embodiments, these time stamps define the exact moment in time, down to a 1-millisecond degree of accuracy, when an event occurs as well as the time between events. In some embodiment, the time stamps can define the exact moment in time down to a 5 second, down to a 1 second, down to a 500 millisecond, down to a 100 millisecond, down to a 50 millisecond, down to a 10 millisecond, down to a 1 millisecond, down to a 0.5 millisecond degree of accuracy, and/or less than a 0.5 millisecond degree of accuracy. The number of events and time stamps along the show timeline can be limitless. For example, as illustrated in FIG. 10, a marching band members opening set, or "set 1" occurs at 0:00.000 along the show timeline. Likewise, set 2, which in this example, occurs eight seconds after set 1, has a time stamp at 0:08.000.

In some embodiments, the show timeline could be that of a high school marching band half time show. The timeline can be −2:00.000-8:00.000 as illustrated in FIG. 10. The two minutes of negative time at the beginning of the timeline are typically used for a band to enter the performance field and set up equipment, and the remaining eight minutes consist of coordinated events, choreographed to music, occurring at specific times along a show timeline, typical of a marching band.

In some embodiments, the show timeline can be based on beats per minute as illustrated in FIG. 11. FIG. 11 illustrates an embodiment of a beats per minute (bpm) show timeline. The beats per minute timeline can progress similarly to music. The rate of the beats per minute can be constant, accelerate and slow down gradually, or speed up or slow down suddenly. As illustrated in FIG. 11, each beat can have corresponding events such as, but not limited to, a set, measure within music, beat within music, location, a step gauged by an accelerometer, a melody note, and a metronome beat. Additionally, information such as, but not limited to, the distance of the participant from the audible time source can be included within each event. The outline of the beats per minute timeline is similar to that of the participant coordinate card illustrated in FIG. 5. However, the beats per minute timeline includes participant's expected event information on a beat by beat basis.

Time Source

Participants move through the show timeline at a predetermined rate or speed determined by a time source, which will also be referred to herein as an audible time source. As an individual learns a drill, they are moving at a rate considerably slower than the full show rate. The audible time source can provide the pace for learning the drill. In some embodiments, the pace provided can be in beats per minute as described herein. As illustrated in FIG. 8, in some embodiments, the audible time source 11 can be positioned at the back of a football field. The audible time source is used to provide uniform pulse for participants. In some embodiments, the audible time source can be, but is not limited to, a metronome operating out of a loudspeaker, an in ear metronome, a midi recording of music being played through in-ear monitors, a conductor visually displaying time through arm gestures, and/or any other audible, visual, and/or haptic cue which uniformly and predictably subdivides time. Additionally, the location of the audible time source can be stationary, mobile, or constantly changing. The audible time source is ancillary to the show timeline and works to ensure participants move through time and space at the same speed. The time source can be controlled with the user interface. The time source can be controlled or altered by the system manager for group activities or by system participants during individual practice. Options for the type of time source and rate of movement can be adjustable at the user's discretion within the user interface. In some embodiments, the time source is a backfield metronome. This metronome can work as the audible time source to keep all participants in lock step with each other to ensure expected musical and visual events are in line and occur at the correct time.

The time source can provide a command sequence to all system users to indicate when movement should begin. The movement command sequence can be a predictable subdivision of time communicated to all users through auditory, visual, or haptic sensation. An example of a movement command sequence is, but is not limited to, eight evenly subdivided pulses from a backfield metronome amplified out of a loudspeaker. The system user can activate the movement command sequence by pushing the necessary button within their user interface.

System Architecture

Figure 12A:
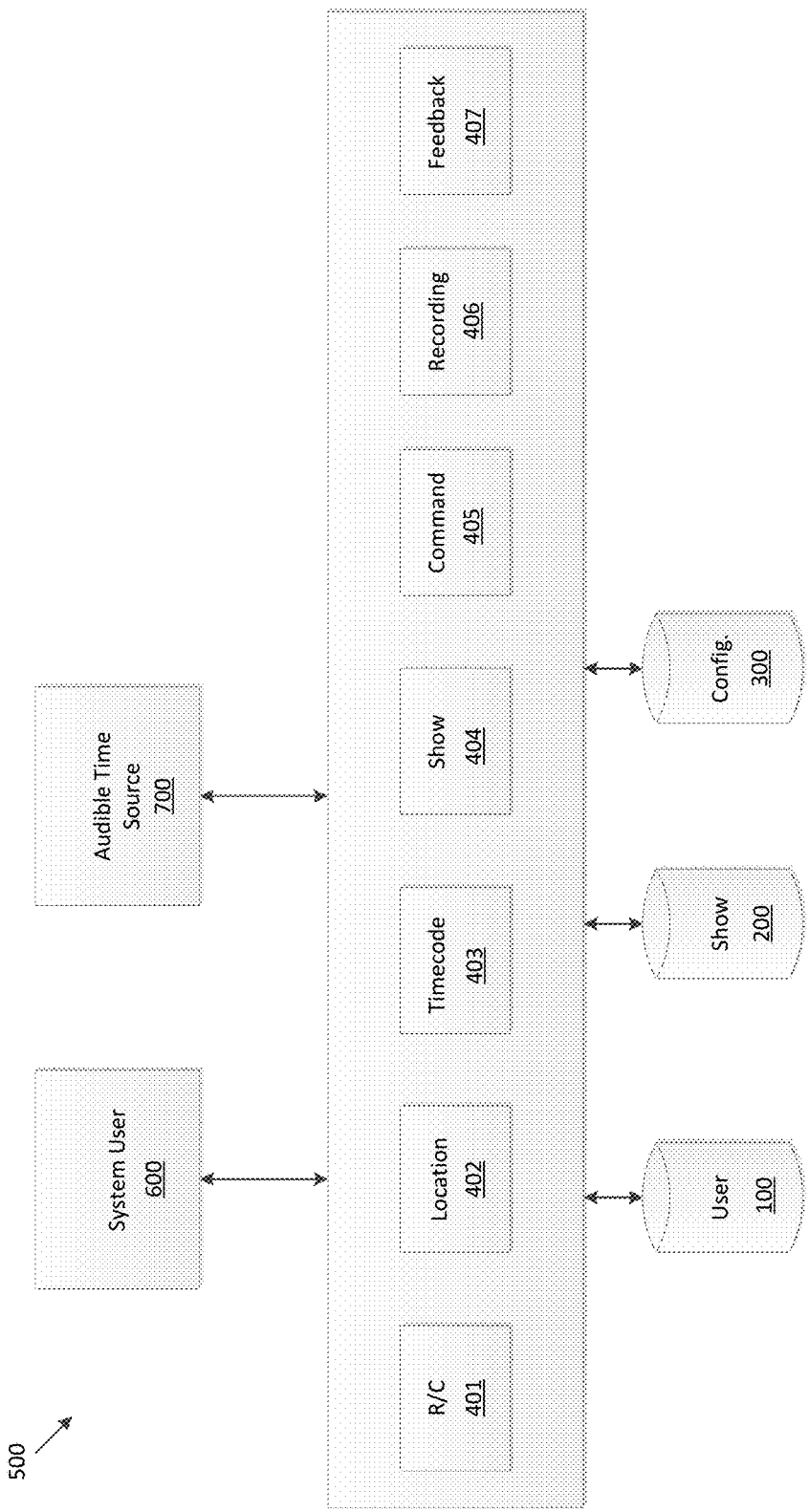
FIG. 12A illustrates an embodiment of a computing environment including databases, controllers, and devices that can be used in the location system.
Figure 12B:
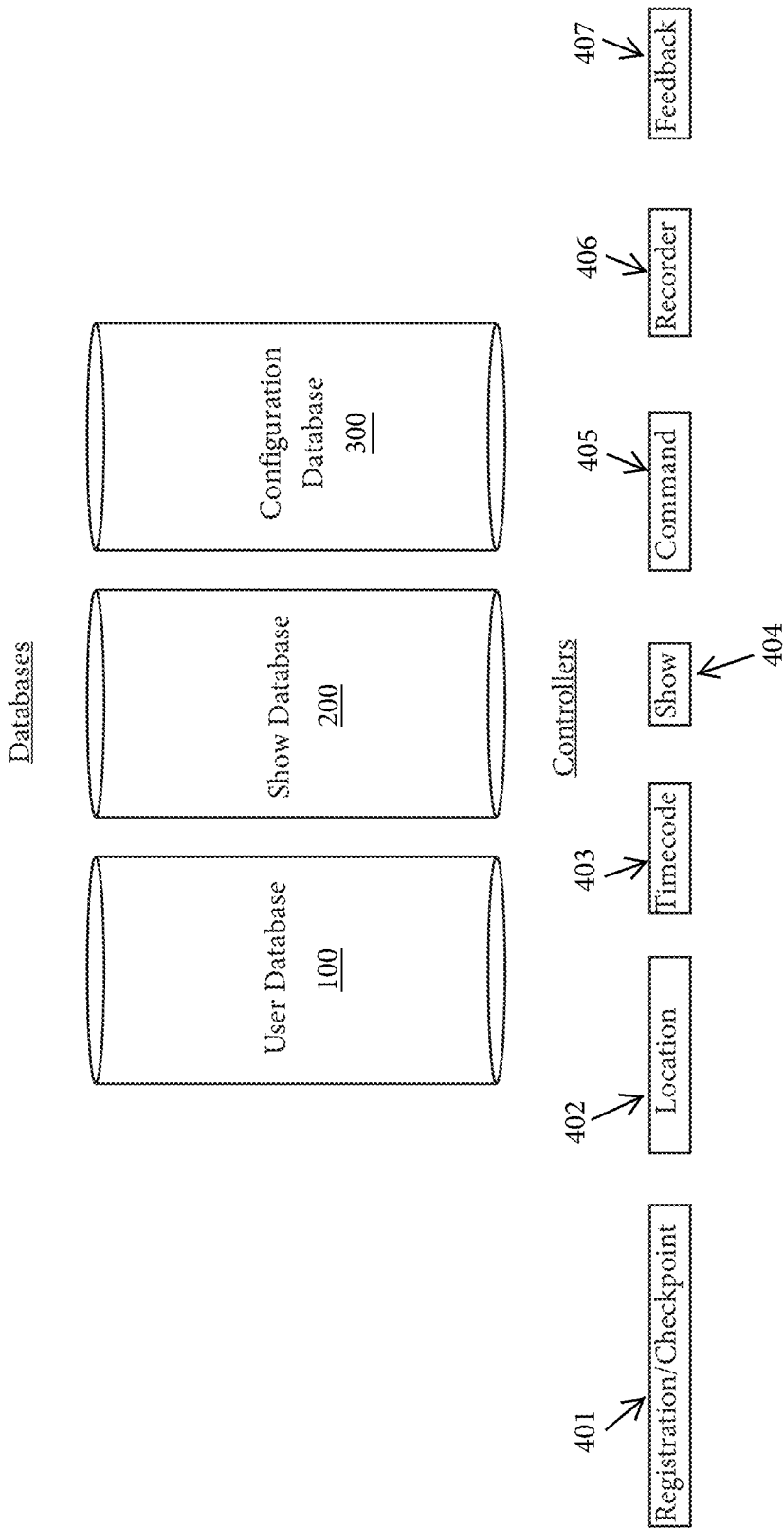
FIG. 12B illustrates an embodiment of databases and controllers that can be used in the computing environment.

The computing environment 500 as shown in FIG. 12A can be used to constantly monitor this information. The computing environment 500 includes a collection of databases and controllers. FIG. 12B illustrates an embodiment of the databases and controllers included in the system. The databases used can include a user database 100, a show database 200, and a configuration database 300. One or more controllers can be used to process the information. In some embodiments, the system can use a registration and checkpoint controller 401, a location controller 402, a timecode controller 403, a show controller 404, a command controller 405, a recorder controller 406, and a feedback controller 407. The system controllers and databases relay location, time, and show information of participants as they move through time and space. The databases of users, timelines, locations, and locations against a timeline continuously compare, through a series of protocols, participant's location against their predetermined location on a predetermined timeline and assign a degree of success to their execution. The controllers described herein can be implemented as software instructions capable of being executed by one or more hardware processors.

FIG. 12A illustrates the components of a computing environment 500 of the location system as described herein. The computing environment 500 includes one or more system user devices 600 and an audible time source 700 as described previously herein.

Registration/Checkpoints Controller

Figure 13A:
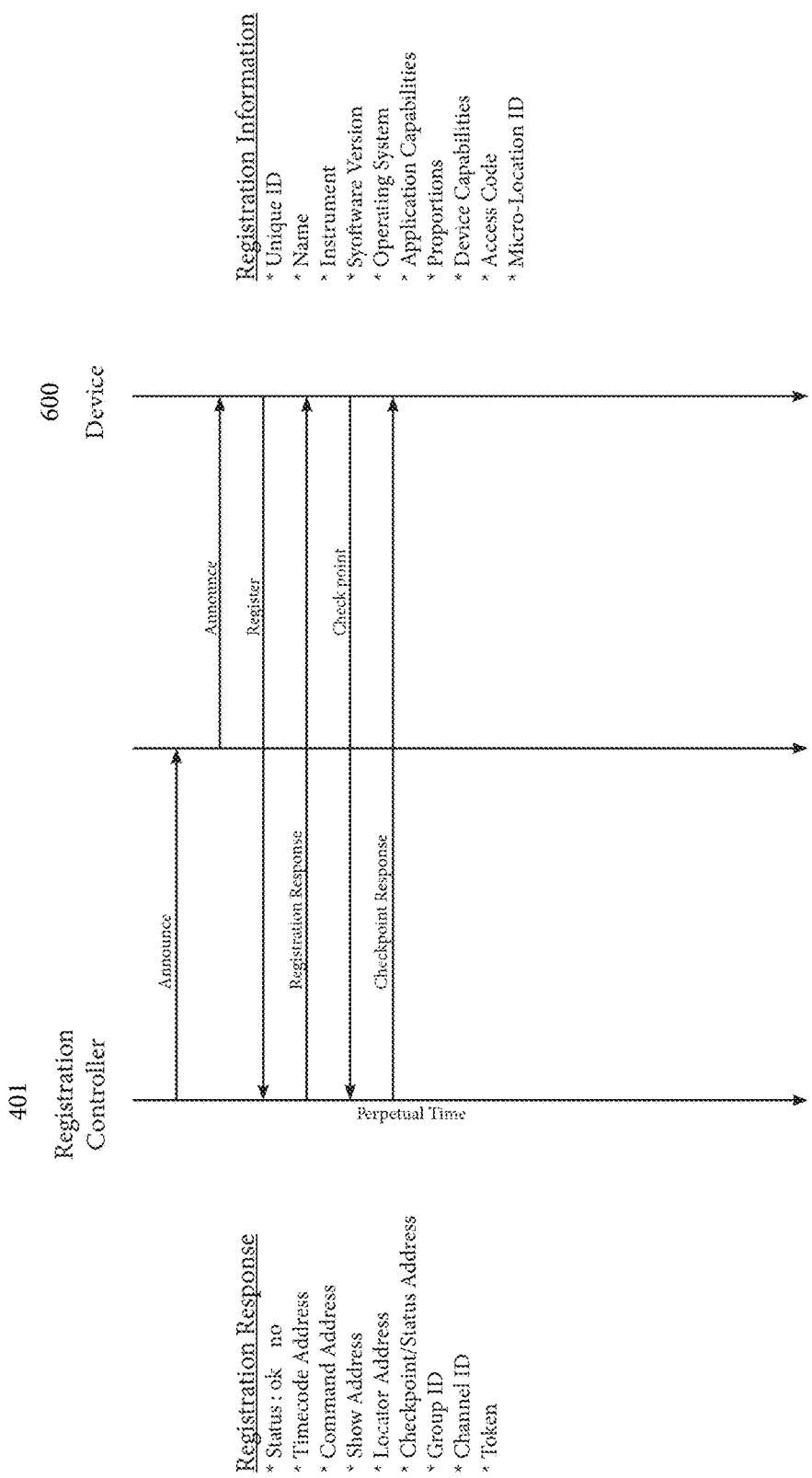
FIG. 13A illustrates an embodiment of a registration controller initial registration communication and checkpoints.

The computing environment 500 illustrated in FIG. 12A includes a registration and checkpoints controller 401. The registration and checkpoint controller 401 allows the participants or system users to register their device to their specific network. FIG. 13A illustrates the communication between the registration controller and a device. In some embodiments, as illustrated in FIG. 13A the registration controller 401 sends out a registration announcement, system ID, and the network access code in multi cast to tell devices where to register. Prior to responding to the network registration announcement signal, a participant or system user downloads an executable software system on their smart device or other device. The system requests user specific information, which is communicated back to the network as the participants' response to the registration announcement. Information such as, but not limited to, the students instrument, drill number, height, inseam length, group name, and location of the micro-location beacon on the participants' body can be entered by the participant. In response to the registration controller's announcement, each device can respond with registration information such as, the device unique ID, name, instrument, software version, operating system, system capabilities, user proportions, device capabilities, network access code, and micro location ID, and/or other user or device information.

The registration response from the registration controller responds with a status response of either "okay" to acknowledge the recognition of the device or communicate that the system does not recognize the device. In addition, the registration response from the registration controller communicates where each device can communicate information back to the system. The registration controller can communicate a registration response including device communication information such as status, timecode address, command address, show address, locator address, checkpoint/status address, group ID, channel ID, token, and/or other communication information. This information can be relayed back to each device in the registration response as illustrated in FIG. 13A.

Figure 13B:
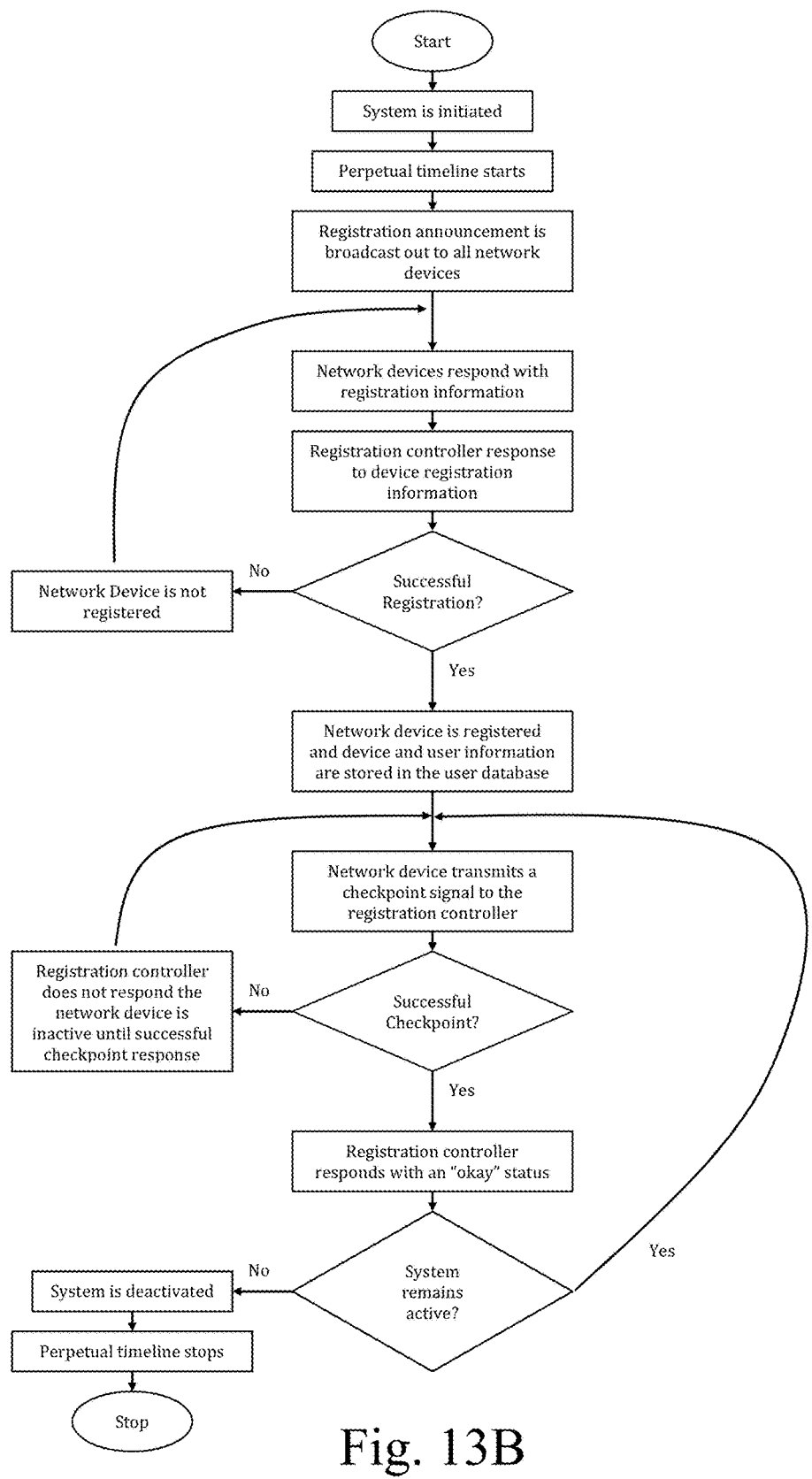
FIG. 13B illustrates an embodiment the process of the registration and checkpoint controller.

FIG. 13B illustrates the functions of an embodiment of the registration and checkpoint controller. As illustrated in FIG. 13B, the registration announcement is broadcast out to all network devices. The network devices respond with the registration information. The system then confirms if the registration is successful. If the registration is not successful, the system tries again to communicate with the network device to respond to the registration announcement with registration information. If registration is successful, the network device is registered and the device and user information are stored in the user database 100 as described herein with reference to FIG. 14 and FIG. 15.

Checkpoint/Status

As illustrated in FIG. 13B, once the registration of a user is complete, the network device or system user 600 transmits a checkpoint signal to the registration/checkpoint controller 401. Once registration is complete, the checkpoint/status controller can monitor the devices on the network or the system user devices for the presence of the devices on the network. The checkpoint/status controller is similar to the initial registration signal and registration controller. The network registration controller assigns a checkpoint/status address to each device for effective network monitoring. The purpose of the checkpoint/status controller is to continuously monitor the presence of network devices within the interactive field against the perpetual timeline. Once the checkpoint status controller's signal is received, the participants' device can respond with an "okay" status indicating the device is still operating in the interactive field as illustrated in FIG. 13A and FIG. 13B. In some embodiments, this response signal can be communicated back to the controller in unicast. A network device that does not respond to the signal can be inactive in the network until the next checkpoint/status signal is communicated as shown in FIG. 13B. This process continues in perpetuity until the network is shut down by the system manager. If the system is shut down or turned to a non-active state, the system is deactivated and the perpetual timeline stops.

Databases

Figure 15:
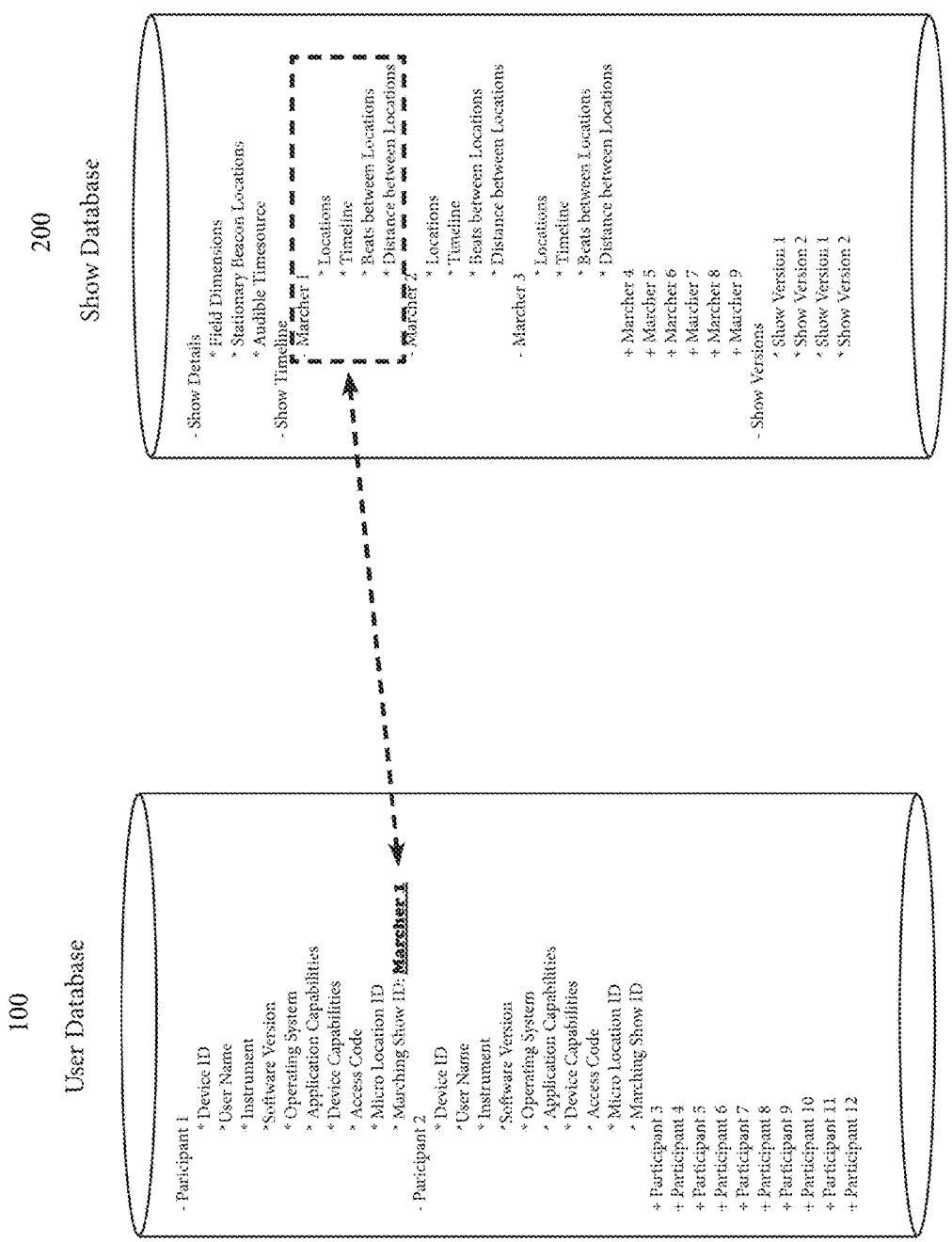
FIG. 15 illustrates an embodiment of the step of a participant in the user database being linked to show information in the show database.

As illustrated in FIG. 12A and FIG. 12B, the computing environment 500 includes a user database 100, a show database 200, and a configuration database 300 to store information necessary for the functioning of the system as described in more detail herein with reference to FIG. 14 and FIG. 15.

Successful registration enters the network participant into the user database 100. The number of users in the user database 100 can be limitless. The user database 100 can house user information such as, but not limited to, each participant's device communication addresses as well as each user's attributes as illustrated in FIG. 14. This information can be stored for network communication purposes as well as to assign location and show information to a user's device as illustrated in FIG. 15. More specifically, device communication addresses and identifiers such as, but not limited to, device ID, group ID, channel ID, micro-location ID, and timecode address can be found in the user database. In some embodiments, user attributes can be stored in the user database 100. In some embodiments, user information such as, but not limited to, the users instrument, height, inseam length, and drill number can be stored in the user database 100.

The show database 200 is the housing location for information such as, but not limited to, the show timeline, all show location coordinates, all location/time time stamps, the show participant roster, field dimensions, field layout, and the show versions as illustrated in FIG. 14. The show database 200 can be populated by a variety of sources such as, but not limited to, other show databases, manually generated information, tracking data, and/or directly from design technology such as, but not limited to, Pyware 3D, Field Artist, or EnVision. Successful registration can pair a network participant in the user database 100 to a set of show information in the show database 200 as illustrated in FIG. 15.

The configuration database 300 can be used to store static configuration data as it relates to the controllers and address information in use to make the system functional as illustrated in FIG. 14. The configuration stores static configuration data for communication between all devices, controllers, and databases. For example, information such as, but not limited to, location servers, servers, and network communication information can be stored in the configuration database. In some embodiments, the information for how the controllers will communicate to the devices and databases to provide analytical output can be stored in the configuration database.

Location Controller & Location Address

Figure 16A:
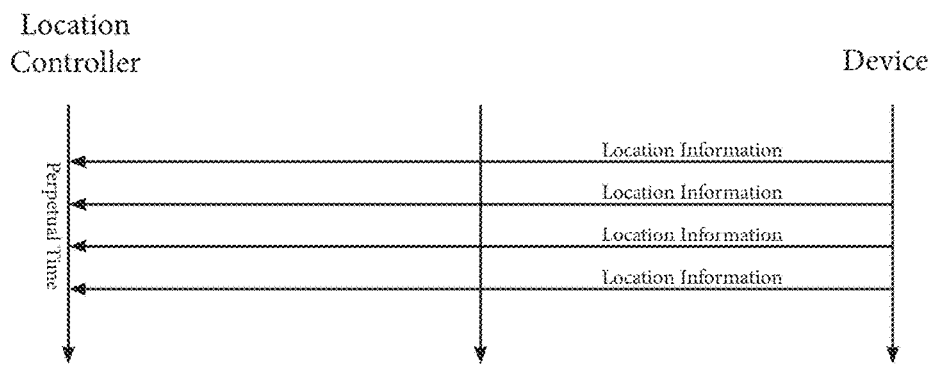
FIG. 16A-B illustrates an embodiment of a location controller, location timestamps along the perpetual timeline, and corresponding locations on an interactive field.
Figure 16B:
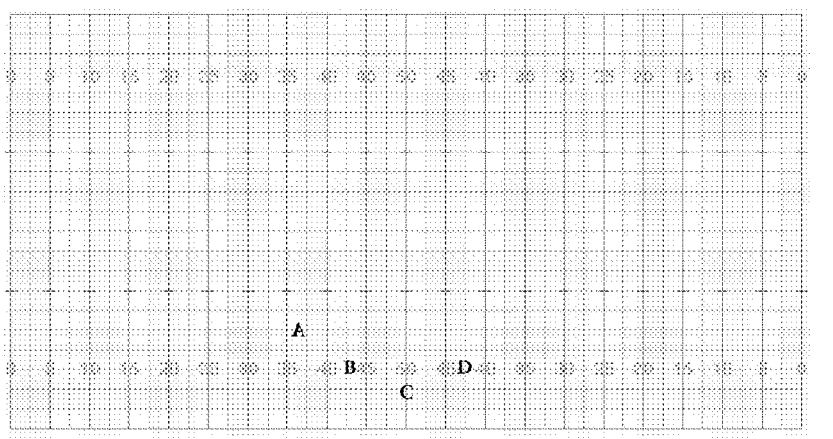

As illustrated in FIG. 12A and FIG. 12B, the computer environment 500 included a location controller 402. The location controller 402 can determine the location of the devices operating in the interactive field against the perpetual timeline based on triangulation. The location controller can be a micro location system specifically designed for tracking a plurality of devices down to a 5 cm degree of accuracy against the perpetual timeline. In some embodiment, the micro location system specifically designed for tracking a plurality of devices can track down to a 1 meter, 50 centimeter, 10 centimeter, 5 centimeter, 1 centimeter, or less than 1 centimeter degree of accuracy against the perpetual timeline. In some embodiment, the user device can communicate to the network via network access points to determine its own location within the field in relation to stationary beacons. In other embodiments, a central locator can determine the location of the devices operating in the field. The network registration controller assigns each network device with a micro location address that the location controller can use to communicate location information of each device against the perpetual timeline as illustrated in FIG. 16A. The location information from the user device is communicated to the location controller which creates timestamps along the perpetual timeline that correspond to the device location at that time. FIG. 16B illustrates the event, location, and timestamp for four events and illustrates a visual representation of locations output onto an example field.

Figure 16C:
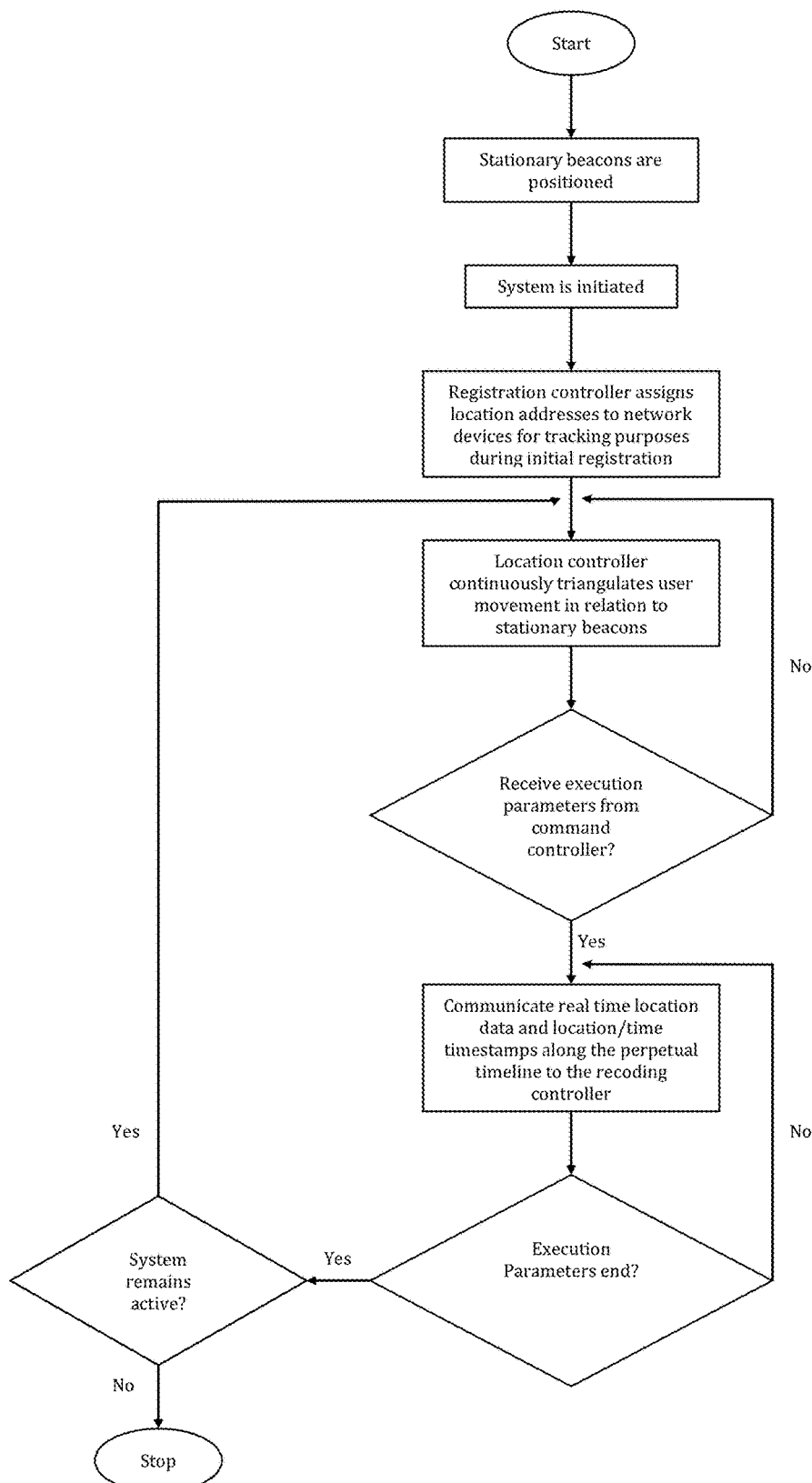
FIG. 16C illustrates an embodiment of a process of the location controller to create the location timestamps.

FIG. 16C illustrates an embodiment of a process to create the location timestamps. The stationary beacon(s) are positioned and the system is initiated. The registration controller assigns the location addresses to network devices for tracking purposes during initial registration. The location controller can then continuously triangulate the user's movement in relation to the stationary beacon(s). The location controller then checks to determine if execution parameters were received from the command controller. If parameters were not received, the location controller continues to continuously triangulate the user movement as illustrated in FIG. 16C until execution parameters are received. If the parameters are received, the location controller communicates location data and location and time timestamps along the perpetual timeline to the recording controller. The location controller continues to provide the recording controller with location data and location and time timestamps until the execution parameters end. Once the execution parameters end, if the system remains active the process can start again with continuously triangulating the user's movements and receiving new execution parameters, otherwise the process ends.

Timecode Controller & Timecode Address

As illustrated in FIG. 12A and FIG. 12B, the computer environment 500 includes a timecode controller 403. The timecode controller 403 can operate the perpetual timeline, ensures all devices are synced to the perpetual timeline, and provides the time stamps for data collected from other controllers along the perpetual timeline. The management of the perpetual timeline can be controlled by the timecode controller 403. The timecode controller 403 can allow the system to order and chronicle information along the perpetual timeline as the packets of information arrive in unordered packets. The timecode controller 403 can chronicle the information for the purpose of feedback and playback. Each network device can be assigned a timecode address to communicate where the devices are in time along the perpetual timeline and ensure the network devices move forward in time at the same rate. Effective management of time allows the system to accurately process and compare the data for feedback and analytics. Network devices operating in the interactive field can be in a constant state of movement. Distance between the participants and the network access point can also be in flux. The timecode controller, through implementation of a protocol, such as precision time protocol, synchronizes the devices to within one millisecond of the main server's perpetual timeline. For example, the precision time protocol is a protocol that is used to synchronize all devices through the system network.

Show Controller

As illustrated in FIGS. 12A and 12B, the computer environment 500 includes a show controller 404. The show controller 404 communicates all information as it relates to users show such as, but not limited to, show locations, show timeline, show locations against the show timeline, the audible time source, location of the audible time source, participant offset of the audible time source, and field dimensions. The predetermined locations of users at specific points along the show timeline are communicated through the show controller 404. The show controller 404, via the show database 200, knows each participant's show locations and show timeline. Unlike the location controller 402, which communicates user's actual location against the perpetual timeline, the show controller 404 communicates the expected locations at specific times against the show timeline.

Figure 17A:
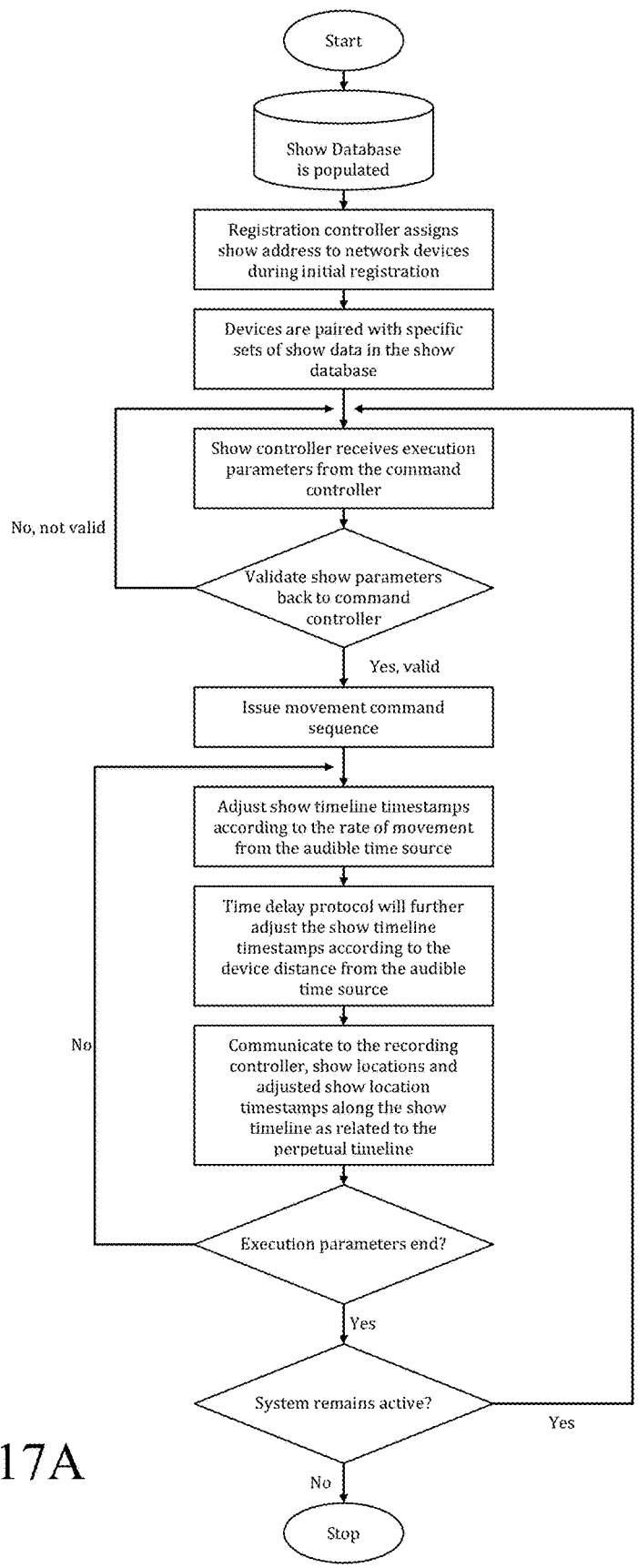
FIG. 17A illustrates an embodiment of the process used by the show controller to communicate expected locations of users at specific times against the show timeline.

FIG. 17A illustrates an embodiment of the process used by the show controller to communicate expected locations of users at specific times against the show timeline. The show database is populated as described previously. During initial registration, the registration controller assigns a show address to each device for effective show communication. The devices can be paired with specific sets of show data in the show database. The show controller then receives execution parameters from the command controller and validates show parameters back to the command controller. If the show parameters are not valid, the show controller can again attempt to receive execution parameters. If the show parameters are valid, the movement command sequence is issued.

In some embodiments, the system can ensure the devices move through time at the same rate, accurate to within 1 millisecond. In some embodiments, the system can ensure the devices move through time at the same rate, accurate to within a 1 second, 500 millisecond, 100 millisecond, 50 millisecond, 10 millisecond, 1 millisecond, 0.5 millisecond, and/or less than a 0.5 millisecond. Proper maintenance of time in the show controller requires effective compensation of the distance between the audible time source and the user. The system can utilize a protocol such as location-offset protocol or time delay protocol. The time delay protocol can compensate for the delay in the speed of sound and ensure all devices move through time together and the performance in aligned sound wise. FIG. 17B illustrates an embodiment of an example of the implementation of the time delay protocol. The time delay protocol monitors the location of the audible time source 700 in relation to each participant and/or network device 600. Participants' distance from the audible time source 700 can be used to ensure the time delay of sound is accurately calculated in all arrival time stamps (audible time source timecode+participant millisecond offset) as illustrated in FIG. 17B. The distance and time are illustrated using a 1 foot/1 millisecond example in FIG. 17B. For the purposes of this example, the millisecond offset is set so that 1 foot of distance is equal to 1 millisecond of time difference. However, the time delay protocol can implement an offset that can be incremented in second, decisecond, centisecond, and/or millisecond intervals to adjust for the physics of sound as it relates to temperature, humidity and air density. Additionally, the offset can specify any distance to correspond to the time offset. The time delay protocol ensures that a set distance corresponds to a set time offset that is applied to the arrival timestamp or expected timestamp for each user.

As shown in FIG. 17A, the show timeline timestamps can be adjusted according to the rate of movement from the audible time source. The time delay protocol adjusts the show timeline timestamps according to the device distance from the audible time source. The show locations and adjusted show location timestamps along the show timeline as related to the perpetual timeline can be communicated to the recording controller. Once the execution parameters end, if the system remains active the show controller process can return to receiving execution parameters from the command controller as shown in FIG. 17A. If the execution parameters have not ended, the show controller process can return to performing the steps of adjusting the show timeline stamps and the time delay protocol as illustrated in FIG. 17A. Once the execution parameters end and the system is inactive, the process of the show controller is done.

In other embodiments, the time delay protocol can ensure all participants move, in lock step, as time is communicated through in ear monitors. For example, if the location of the time source is determined to be at the intersection of the 50-yard line and the back sideline, the time delay protocol adjusts the time at which each participant's device transmits time based on where the audible time source is moving. The audible time source is no longer coming out of a loud speak, but being sent through to all network devices or other devices communicating with in ear monitors. The result is that all participants, despite the potentially large distance between them, receive the audible time source signal at the same time. As a secondary result, if a participant is asked to move (march) their feet with the received signal, all their feet would be in sync visually.

The time delay protocol can calibrate the arrival time stamps or expected timestamps within the show database for each participant in relation to the location of the audible time source. For example, if a participant has an event on the show timeline with a specified arrival time of 01:00.000 and is 56 feet from audible time source at the expected arrival time, the time delay protocol can adjust the expected arrival time within the show database to 01:00.056.

In an embodiment, for a drill design, everything moves together at the same time. However, to someone skilled in the art of show design, they are aware of the term "listen back" to take timing from what they hear approaching them. This can be how musicians deal with the speed at which sound travels to keep the music timing correct when it arrives at the audience. An individual can notice a 20 millisecond delay if they know what to listen for and a 50 millisecond delay is obvious to someone unskilled. For example, for an audible time source located on side 2, 10 feet in from the back sideline on the 20 yard line, the musician standing on side 1, 10 feet in from the front sideline on the 20 yard line, they are approximately 240 milliseconds delayed, or behind, the audible time source. If all participants were marching and playing with the millisecond-level accuracy of technology, the sound would be incoherent because the speed of sound was not accounted for with the audience hearing those on the front side of the field 100 to 150 milliseconds before the back side. In some embodiments, through the use of a designated audible time source and the time delay protocol as described herein, an individual's expected movements and music can be delayed an appropriate amount of time, as it is presented to them on the field, to account for the physics of sound. In some embodiments, this can also be captured in the recording and encapsulated as part of the feedback to account for expected delays and even indicate when someone was early. This does not change the tempo or the distance moved, only the actual expected time when an event should occur.

In some embodiments, the controller can individually communicate with ear pieces or other device on the users person and the controller can individually delay transmission of the audio single based on the distance the user is from the audio source. In some embodiments, the distance is also changing dynamically when the controller is determining the distance as the marcher moves based on the transmission source and/or user device.

Figure 18A:
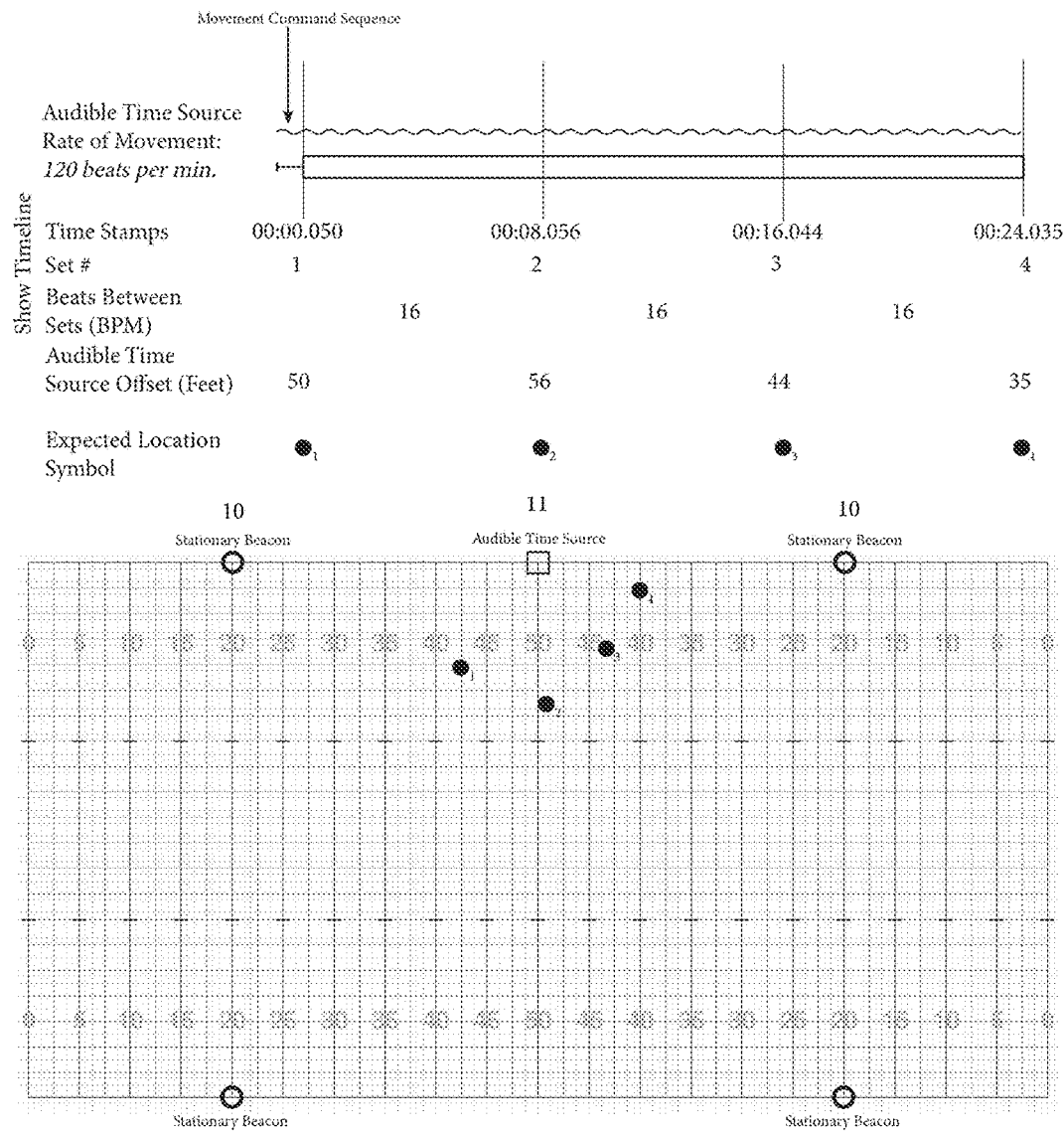
FIG. 18A illustrates an embodiment of a show controller, audible time source communicating a rate of movement of 120 beats per minute, movement command sequence, show timeline, timestamps for expected locations along a show timeline, corresponding events for the show timeline timestamps, number of beats between events, a participant's location offset from the audible time source, and participants expected locations on an interactive field.
Figure 18B:
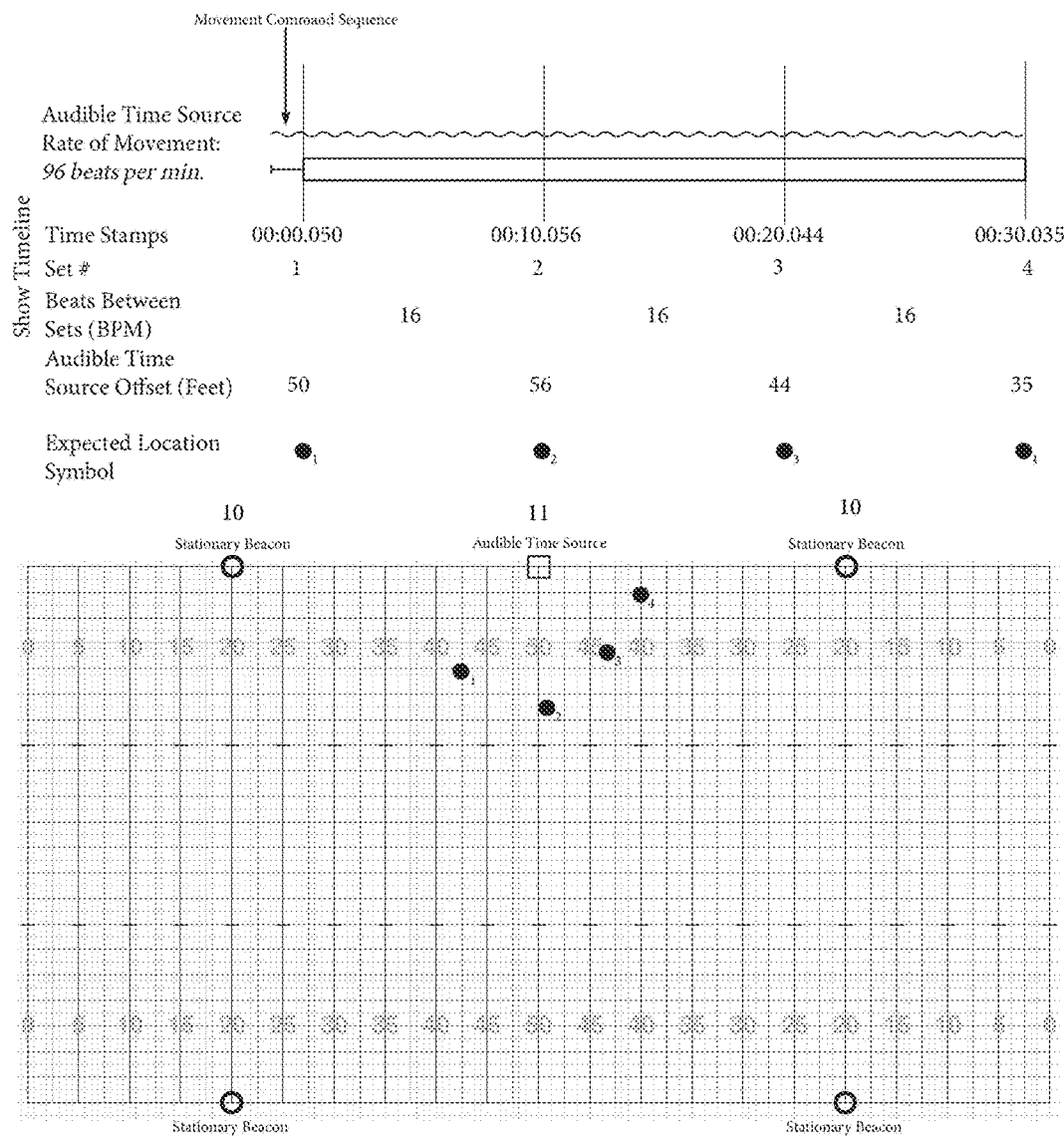
FIG. 18B illustrates an embodiment of a show controller, audible time source communicating a rate of movement of 96 beats per minute, movement command sequence, show timeline, timestamps for expected locations along a show timeline, corresponding events for the show timeline timestamps, number of beats between events, a participant's location offset from the audible time source, and participants expected locations on an interactive field.
Figure 20A:
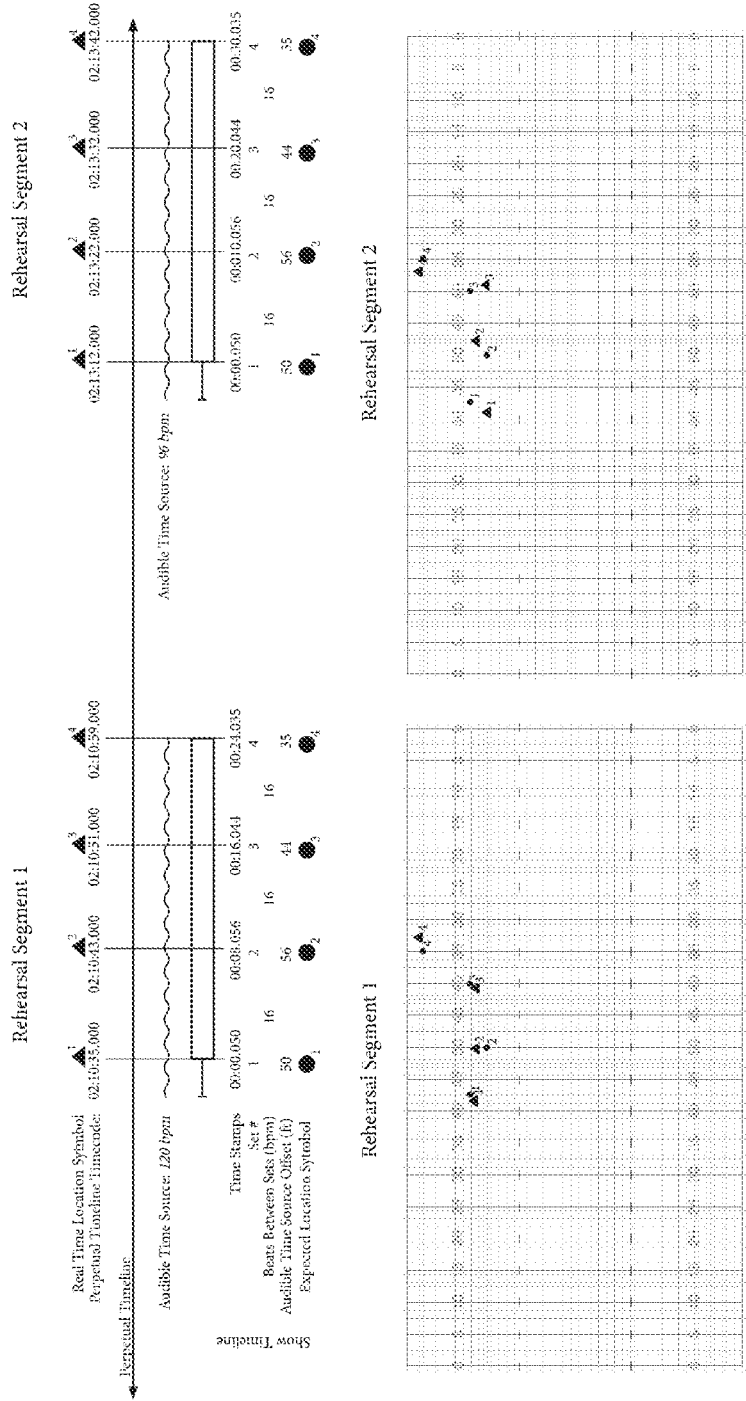
FIG. 20A illustrates an embodiment of recorded information within a recorder controller for two rehearsal segments including, locations, time stamps for locations against a perpetual timeline, an audible time source with a movement command sequence, time stamps on a show timeline corresponding to a perpetual timeline, show events (locations) corresponding to time stamps on a show timeline corresponding to a perpetual timeline, event (location) numbers, beats per minute between events (locations), number of beats per minute between events (locations), a participants location offset from an audible time source, locations and expected locations on an interactive field.

An example of the show controller data is illustrated in FIG. 18A and FIG. 18B. In these examples, a system manager has preset all the desired settings for the show segment a single participating marcher will execute. In both illustrations, the participant will execute a show segment beginning at set 1 and ending on set 4 in the show timeline. The audible time source is a metronome located at a fixed position at the intersection of the 50-yard line and the back sideline of an American football field, and the rate of travel will be 120 beats per minute in FIG. 18A and 96 beats per minute in FIG. 18B. The command sequence to begin execution is eight preparatory beats at 120 beats per minute from the backfield metronome. As described previously, the show controller 404 can gather show information from the show database 200. In both examples, the show controller knows the expected location for all sets, the number of beats between each set, the location of the audible time source, and the audible time source offset for each set for the participant. The time stamps along the show timeline for each event, which in this case events are expected locations, can change according to the rate at which the user moves through time and space. In the example shown in FIG. 18A, the timestamps for set arrivals occur every eight seconds. In the example shown in FIG. 18B, the timestamps for set arrivals occur every ten seconds. Then the show controller adjusts the show timeline time stamps according the offset of the audible time source. Through this process the show controller can produce time stamps for events along the show timeline according to the rate of movement through time. Examples of these adjusted timestamps are illustrated in the Time Stamps row in FIG. 18A and FIG. 18B. Then the show controller tags the show information, including the adjusted show timeline time stamps, along the perpetual timeline as illustrated in FIG. 20A.

Command Controller

As illustrated in FIG. 12A and FIG. 12B, the computer environment 500 includes a command controller 405. The command controller 405 can receive and transmit information pertinent to the expectations of the sequence of events taking place. In some embodiment, the command controller can communicate information from the user interface such as, but not limited to, the audible time source location, beats per minute from the audible time source, rate at which time in the show timeline is running, the movement command sequence, beginning and ending sets along the show timeline, instruments or people included in the execution, who is being recorded, expected degree of accuracy, a "go" command to begin the sequence, and stop command to abort the execution. The command controller can validate the execution parameters and distribute the information to the system.

Figure 19:
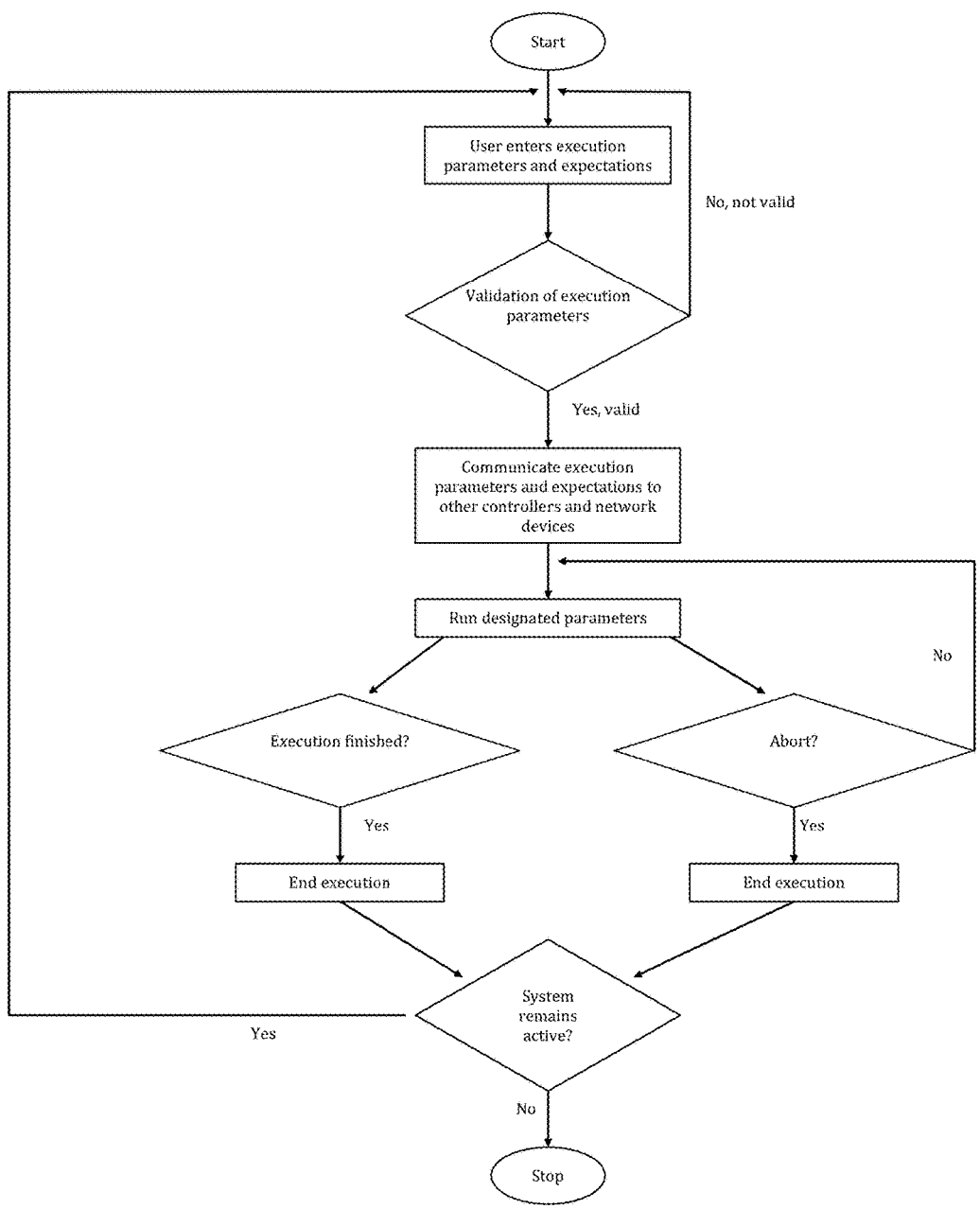
FIG. 19 illustrates an embodiment of the process of the command controller.

FIG. 19 illustrates an embodiment of the process of the command controller. The user first enters execution parameters and expectations to the system. These user execution parameters and expectations can be entered using a user interface and/or other device that allows for the instructions and information to be communicated to the system. The execution parameters are then validated, and if valid, the execution parameters and expectations can be communicated to the other controllers and network devices. The designated parameters are run until the execution is finished or aborted as shown in FIG. 19. Once the execution is finished or aborted the execution is ended and if the system remains active, the process returns to checking for user execution parameters and expectations as illustrated in FIG. 19. If the system is no longer active, then the process is stopped.

Recording Controller

As illustrated in FIG. 12A and FIG. 12B, the computer environment includes a recording controller 406. The recording controller 406 can store information from the registration controller, timecode controller, location controller, show controller, and command controller for the purpose of playback and analyzing the sequence of events after the fact as illustrated in FIG. 20A. FIG. 20A illustrates an embodiment of the information stored on the recording controller.

Figure 20B:
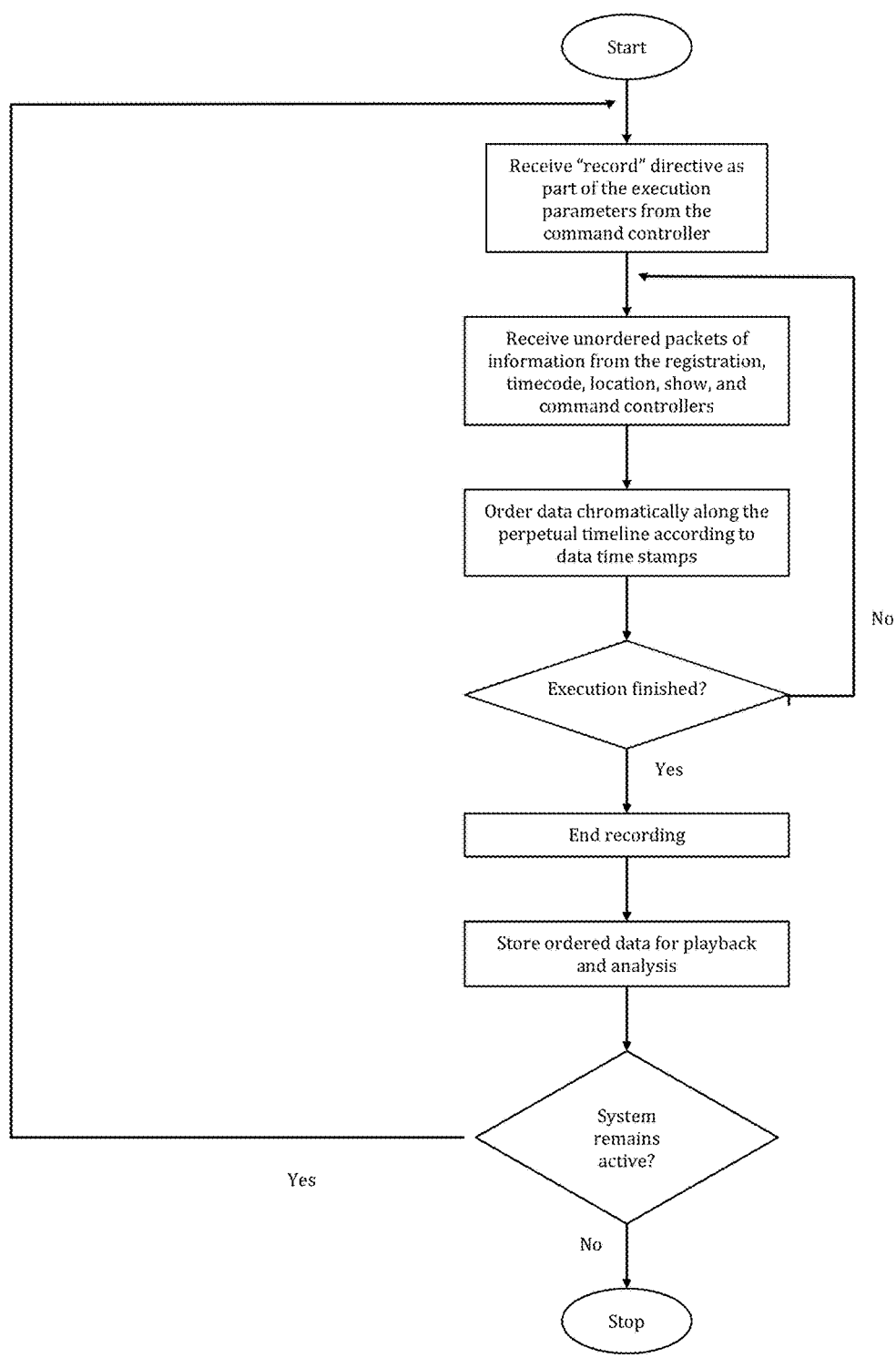
FIG. 20B illustrates an embodiment of the process of the recording controller.

FIG. 20B illustrates an embodiment of the process of the recording controller 406. The recording controller 406 is initiated when it receives a "record" directive as part of the execution parameters from the command controller. The recording controller can receive unordered packets of information from the registration, timecode, location, show, and/or command controllers. The unordered data received can be processed by the recording controller. The recording controller can order the data chromatically along the perpetual timeline according to the data time stamps. Once the execution is finished the recording controller can end recording and store ordered data for playback and analysis. If the system remains active, the process of the recording controller can restart with the recording controller receiving a record directive as illustrated in FIG. 20B. If the system is inactive after the execution is finished, the recording controller process stops.

User Interface

Figure 21:
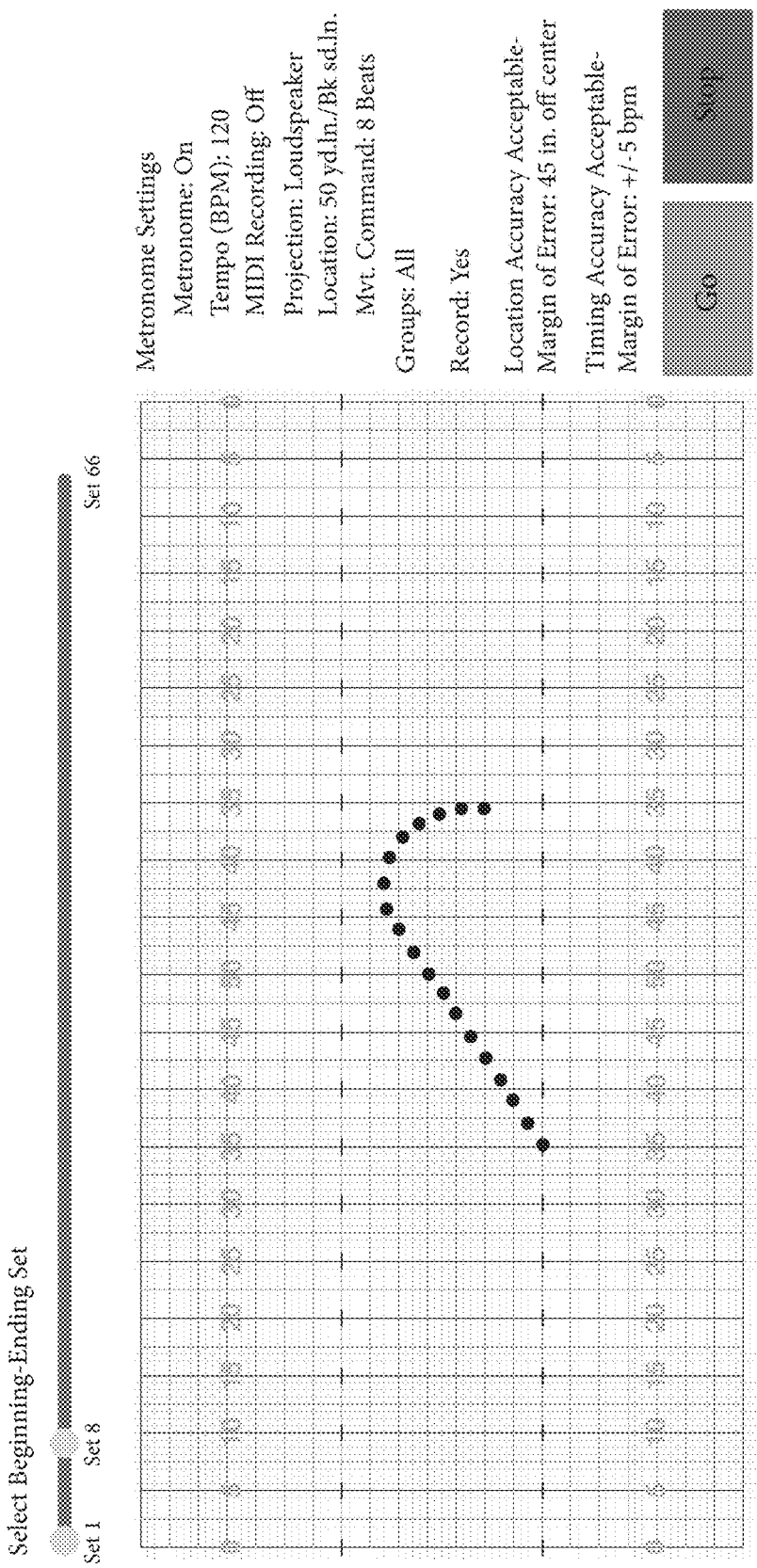
FIG. 21 illustrates an embodiment of a user interface.

FIG. 21 illustrates an embodiment of a user interface for use with the system described herein. The gateway for manipulation of the execution parameters, expectations, and/or instructions by the user is through the user interface on a device such as, but not limited to, a smart phone, tablet, personal computer and/or other computer device as illustrated in FIG. 21. In some embodiments, both participant and manager can control execution parameters and accuracy expectation such as, but not limited to, the type of audible time source, the audible time source location, beats per minute from the audible time source, rate at which time in the show timeline is running, the movement command sequence, beginning and ending sets along the show timeline, instruments or people included in the execution, who is being recorded, expected degree of accuracy, a "go" command to begin the sequence, and stop command to abort the execution. For example, FIG. 21 illustrates examples of parameters that can be set through the user interface. In some embodiments, a participant may determine and/or input the execution parameters through the user interface on their user device to outline expectations for their individual movement and location. In some embodiments, a manager may determine, propagate, and/or input expectations for a plurality of users through the user interface on their user device.

Feedback Controller

Figure 22A:
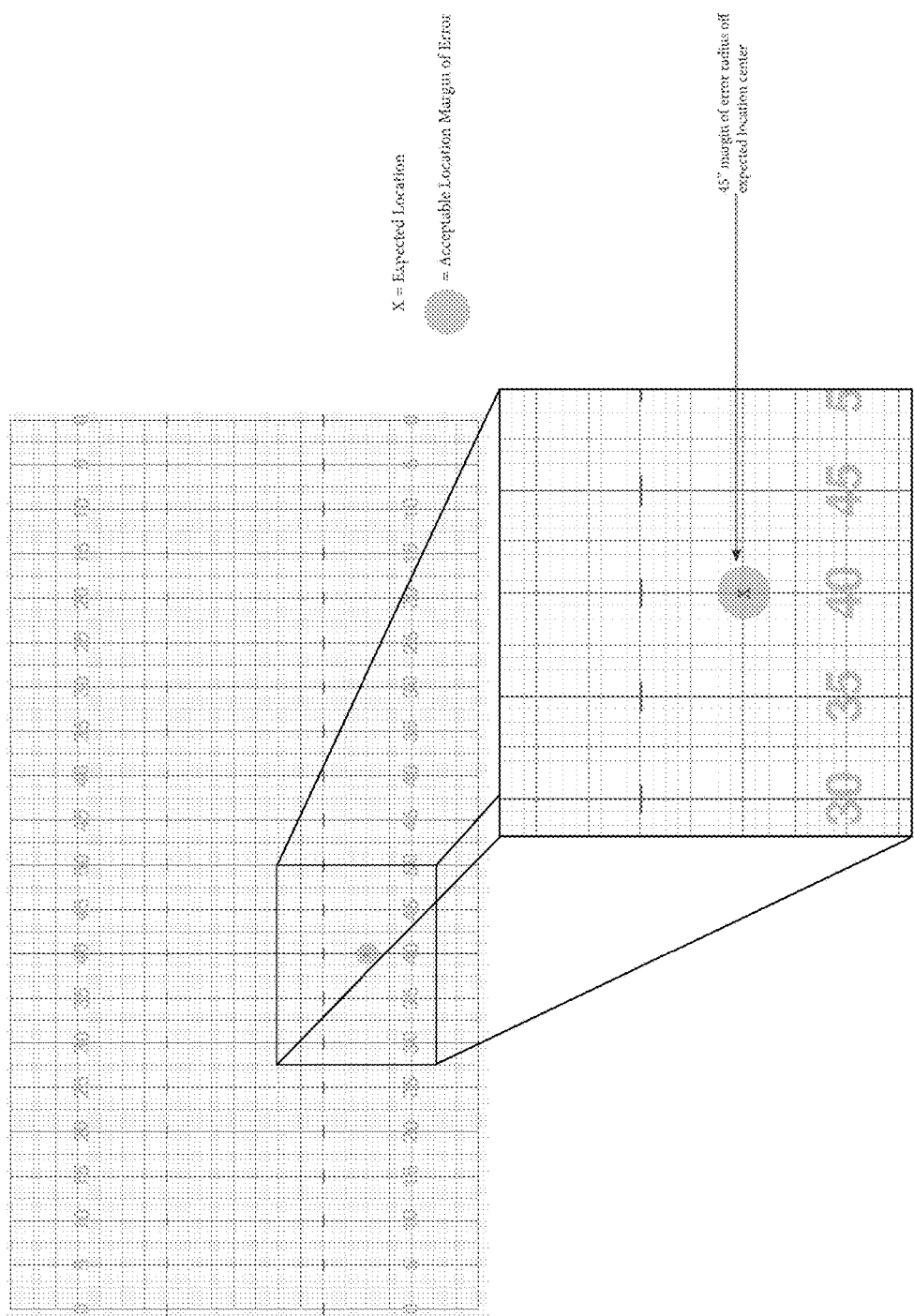
FIG. 22A illustrates an embodiment of an acceptable margin of error in location between expected and detected events.
Figure 22B:
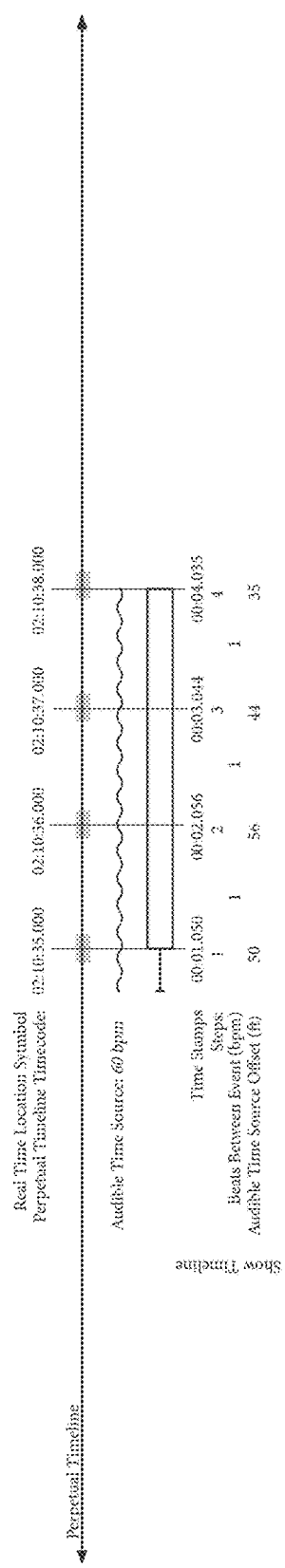
FIG. 22B illustrates an embodiment of an acceptable margin of error in timing between expected and detected events.

The system can provide the user with feedback information based on the location system. As illustrated in FIGS. 12A and 12B, the system includes a feedback controller 407. The feedback can provide the end user with analytics for accuracy of event location and event timing. The feedback controller can compare recorded data points allowing the participant and manager to receive feedback. The feedback information can be complied with respect to the degree of accuracy accepted by the system. The degree of accuracy between expected events and actual events can be determined and input to the system through the user interface and communicated to the system through the command controller. In some embodiments, the user can set accuracy expectations such as, but not limited to, the acceptable margin of error in distance from an expected event location and the acceptable margin of error in timing from an event as illustrated in FIG. 22A and FIG. 22B. The margin of error illustrated in the figures described herein is not to scale and intended for illustration purposes. In some embodiments, the margin of error can be greater than, less than, and/or equal to the examples of margin of errors described herein and illustrated in the embodiments in the figures.

Figure 23:
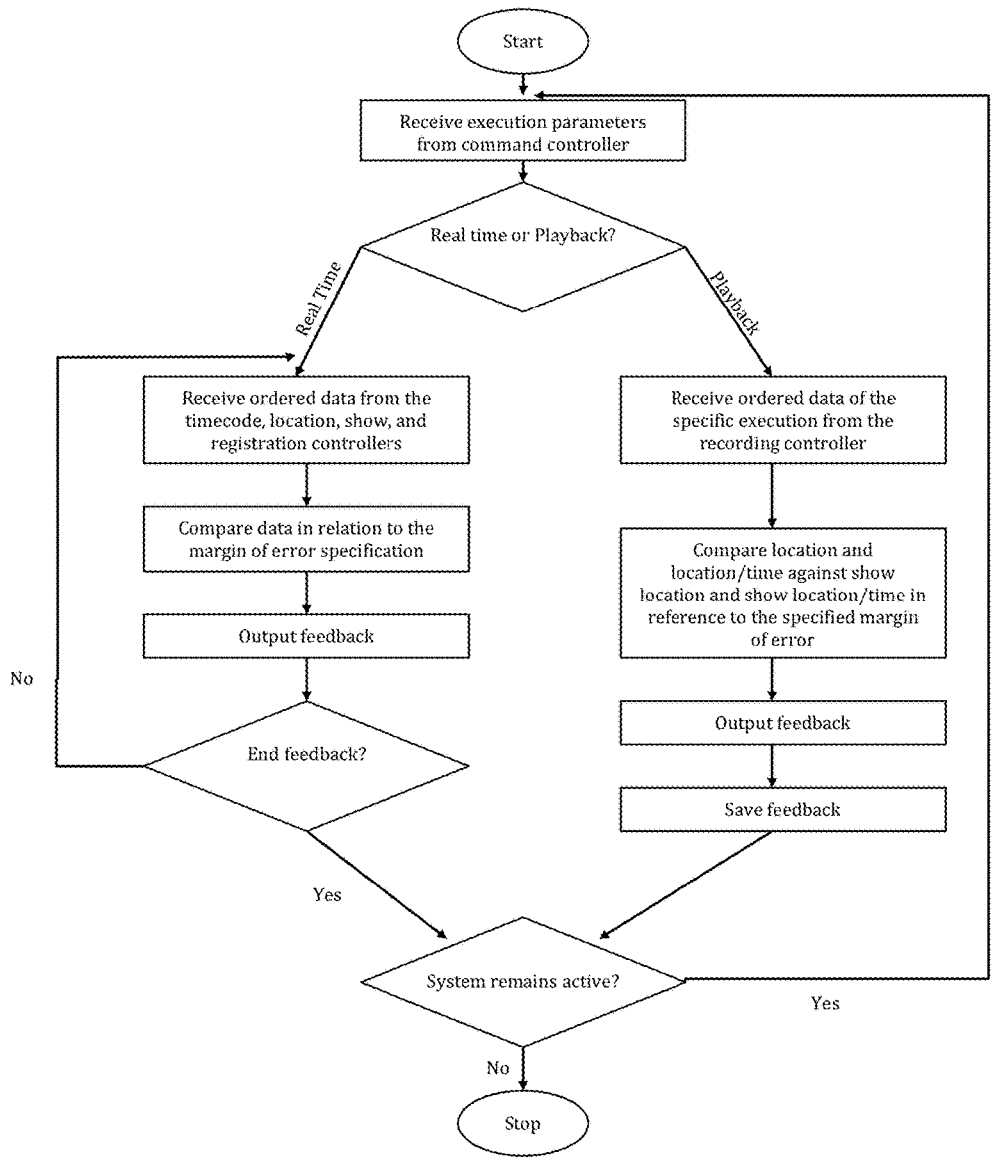
FIG. 23 illustrates an embodiment of the process of the feedback controller.

FIG. 23 illustrates an embodiment of the process of the feedback controller 407. The feedback controller receives execution parameters from the command controller. The execution parameters can include information about whether to provide feedback in substantially instantaneous or playback mode. In some embodiments, this can be referred to as real time. Real time and/or substantially instantaneously as used herein can mean in less than 30 seconds, less than 20 seconds, less than 5 seconds, less than 1 second, and/or less than 1 millisecond. In substantially instantaneous feedback mode, the feedback controller can received ordered data from the timecode, location, show and registration controllers. The ordered data is compared in relation to the margin of error specification. The substantially instantaneous feedback is output to the user device. The substantially instantaneous feedback can continue and return to providing substantially instantaneous feedback until the feedback is ended by the user and the system is turned to an inactive state.

For example, the system can provide feedback to allow the managers device to communicate to the user devices and the users can adjust their movements or positioning accordingly. For example, this can be useful in learning and teaching a marching drill. The manager can say to the system "all users need to find and stand in set 1." The system will send the signal to all devices to stand in set 1. Each participant's device will then show them where they are on the interactive field and where their set 1 location is. Once they are standing in set 1, the user interface will give them some sort of visual, audio and/or haptic feedback to indicate they are in the correct location. This same thing can be true for the manager, who can receive data from user devices and the system can provide feedback, for example, visualize feedback, on the user interface when the participants have found their location. The system can also provide feedback information including details of accuracy in execution by the participants as described with reference to FIGS. 24-29. In some embodiments, the feedback can be substantially instantaneous to allow the user to adjust and/or make changes before proceeding to the next set in the drill and/or for the next time the drill is run. In some embodiments, substantially instantaneous feedback can include feedback communicated to the device in less than 30 seconds, less than 20 seconds, less than 5 seconds, less than 1 second, and/or less than 1 millisecond.

The playback feedback mode can also be produced by the feedback controller. As illustrated in FIG. 23, The feedback controller receives ordered or unordered data of the specific execution from the recording controller. The location and location/time timestamp data is compared against show location and show location/time timestamp data in reference to the specified margin of error. The playback feedback is output to the user device and can be saved by the user or automatically for later use.

FIGS. 24-29 illustrate examples of feedback that can be provided to the user of the system. The feedback and analysis for groups and individuals can be provided to the end user in forms such as, but not limited to, lists, playback, and overlay as illustrated in FIGS. 24-29. The feedback can be displayed or output to the user device and/or to be stored in a storage location for later access or use. The feedback can occur substantially instantaneously or through the playback function. FIG. 24 illustrates an embodiment of a location feedback for an individual in the form of a list. The list can be annotated to provide a visual assessment of how accurate the participant or users movement were. For example, as shown in FIG. 24, a visual indication can be provided for a detected or tracked location determined through the processes of the system that is a certain distance from the expected or predetermined location. The visual indication can be different as the user location is further away from the expected location. In some embodiments, if a user location is determined to be close to the predetermined or expected location the visual assessment can be a green color and/or other indicia indicating that the user location is within an acceptable distance from the expected location. In some embodiments, if a user location is determined to be a greater distance from the predetermined or expected location the visual assessment can be a red color and/or other indicia indicating that the user location is at a further distance from the expected location and the user needs can adjust the positioning to more closely correlate to the expected location. In some embodiments, if the user location is determined to be in between the two distance thresholds for green and red indicia, the visual assessment can be a yellow color indicating that the user may need to make minor adjustments.

Figure 25:
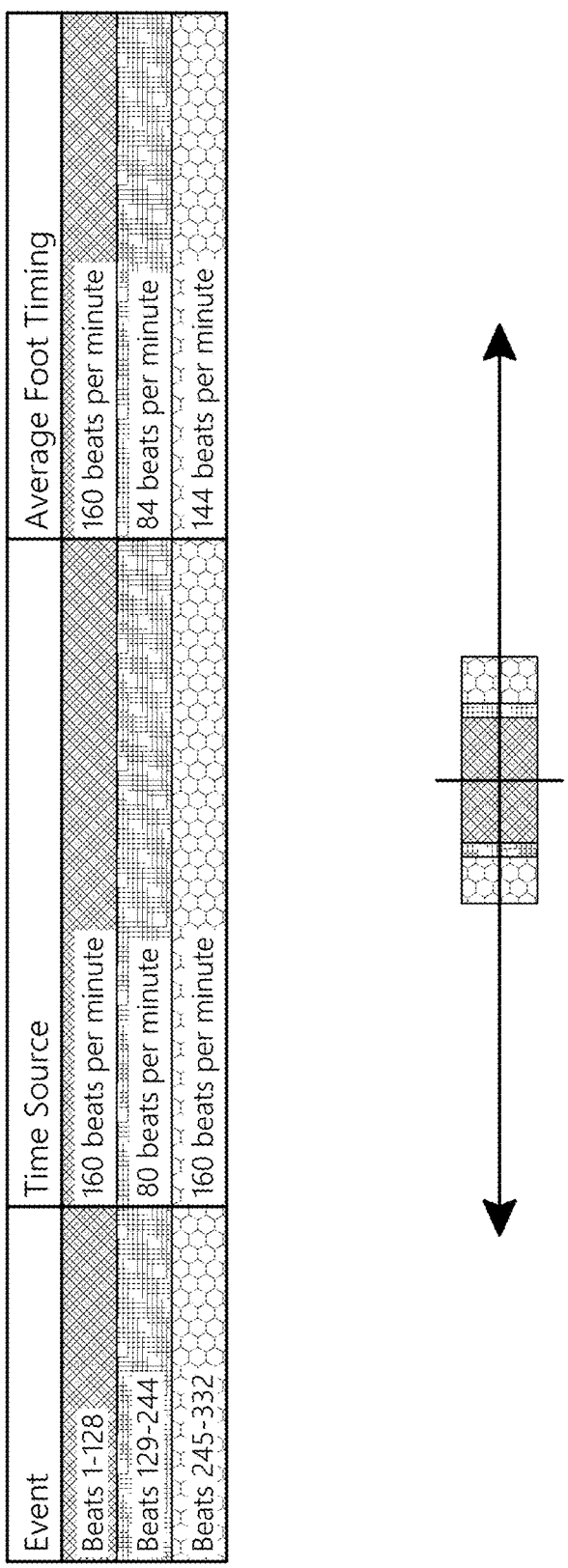
FIG. 25 illustrates an embodiment of a timing feedback for an individual's foot speed gauged by an accelerometer against the audible time source in the form of a list.
Figure 26:
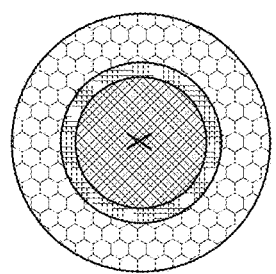
FIG. 26 illustrates an embodiment of a step size feedback for an individual in the form of a list.

FIG. 25 illustrates an embodiment of a timing feedback for an individual's foot speed gauged by an accelerometer against the audible time source in the form of a list. FIG. 25 illustrates if a person is moving too fast or too slow based on the expected beats per minute. FIG. 26 illustrates an embodiment of a step size feedback for an individual in the form of a list. As illustrated in FIG. 25 and FIG. 26, similar to the list of FIG. 24, the lists of FIG. 25 and FIG. 26 can be annotated to provide a visual assessment of how accurate the foot timing and step size are respectively. The visual assessment can provide positive or negative indicia, colors, or other indicia indicating if the actual measurements are close to or far from the expected and/or predetermined value similar to the indicia described with reference to FIG. 24.

Figure 27:
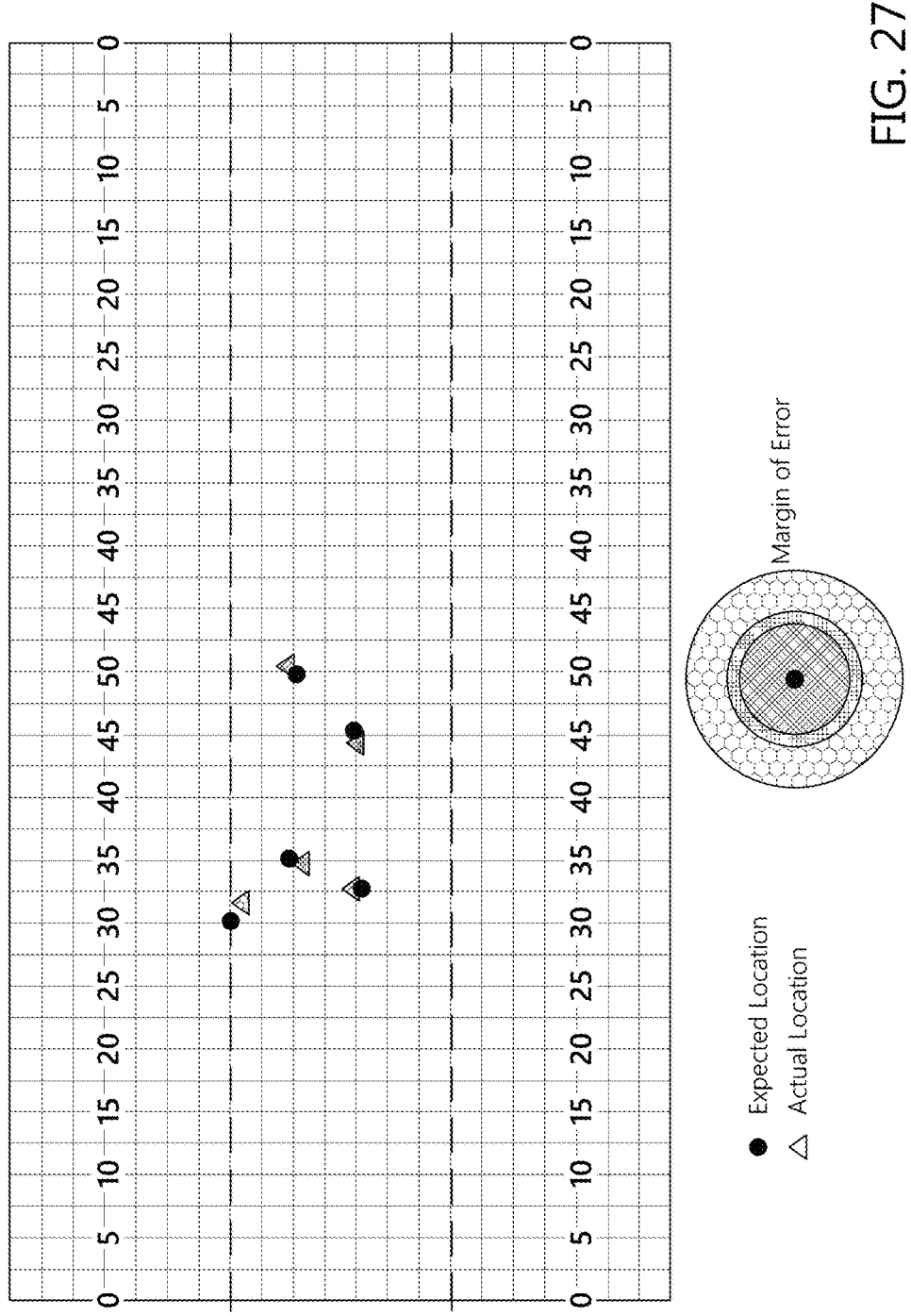
FIG. 27 illustrates an embodiment of a location feedback for an individual in the form of overlay.
Figure 28:
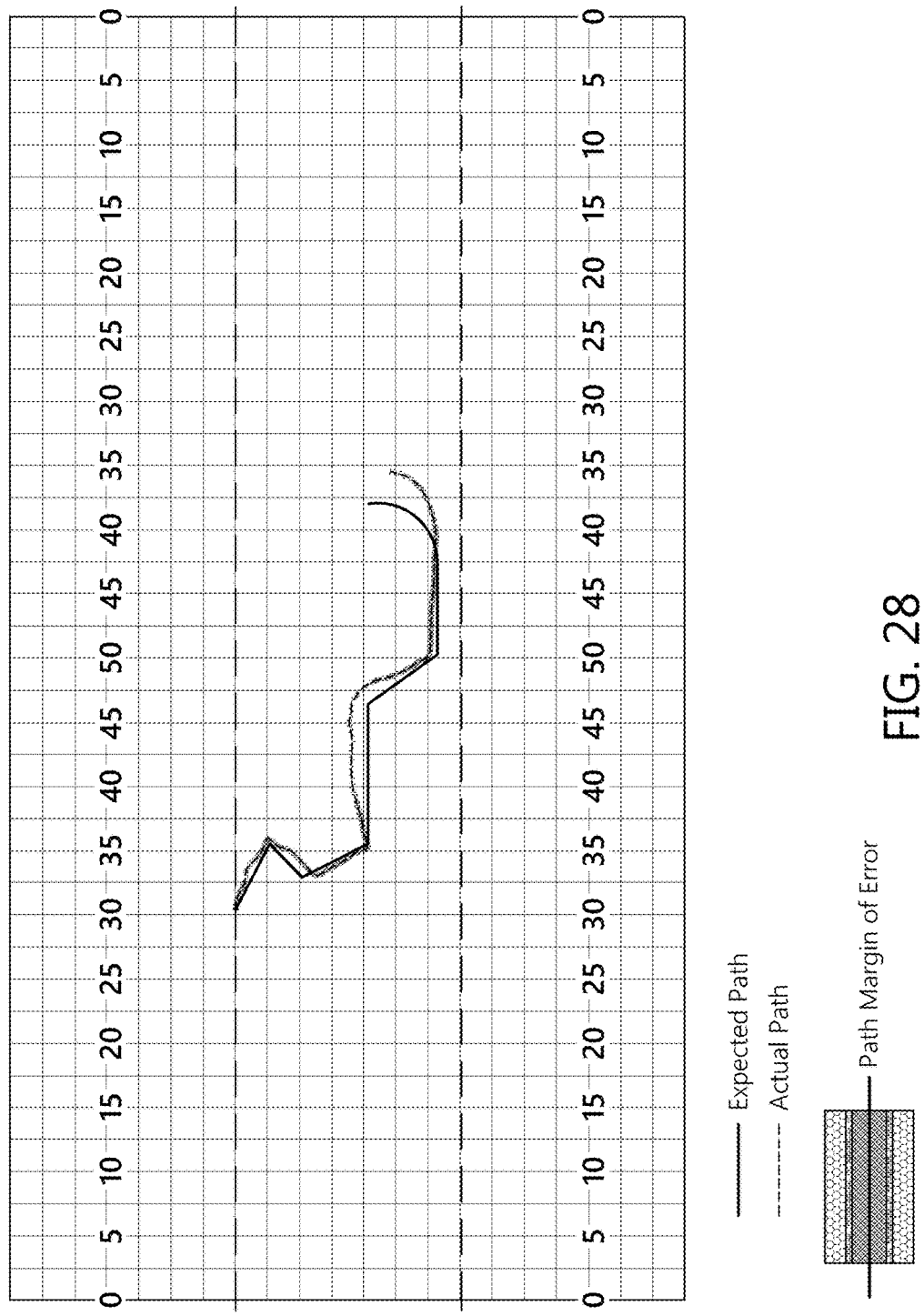
FIG. 28 illustrates an embodiment of a path feedback for an individual in the form of overlay.

FIG. 27 illustrates an embodiment of a location feedback for an individual in the form of overlay. FIG. 28 illustrates an embodiment of a path feedback for an individual in the form of overlay. FIG. 29 illustrates an embodiment of a location feedback for a group in the form of overlay. The overlay illustrated in FIG. 27, FIG. 28, and FIG. 29 can display the actual location or path as determined by the process of the location system described herein and the expected location or path. The location and path feedback can be displayed on one or more user devices or stored in the system for later use. The location and path feedback can be provided to the user device with an annotation and/or indicia indicating the distance or degree outside the margin of error that the location or path of the user is from the expected location or path. In some embodiments, the location or path of the user that is further from the expected location or path can be annotated with a red color and/or other indicia indicating that the location or path is at an outer threshold that is furthest end from the margin of error. In some embodiments, the location or path of the user that is closer to the expected location or path can be annotated with a green color and/or other indicia that indicate that the location or path is within the margin of error. In some embodiments, if the location or path of the user is determined to be in between the two distance thresholds for green and red indicia, the visual assessment can be a yellow color indicating that the user is within the margin of error threshold. In some embodiments, the overlay feedback can also be provided for the foot timing and/or step size including or similar to the information illustrated as provided with reference to FIG. 25 and FIG. 26. In some embodiments, the user device and/or display can provide an audible time source and audible signal that is concurrently provided to the user with the displayed feedback as the user is moving between positions. The display can also provide a substantially instantaneous average step size and/or step length. All the indications and feedback information can be provided together in one screen on the user device or they can be provided separately and in separate screens or displays.

Figure 30:
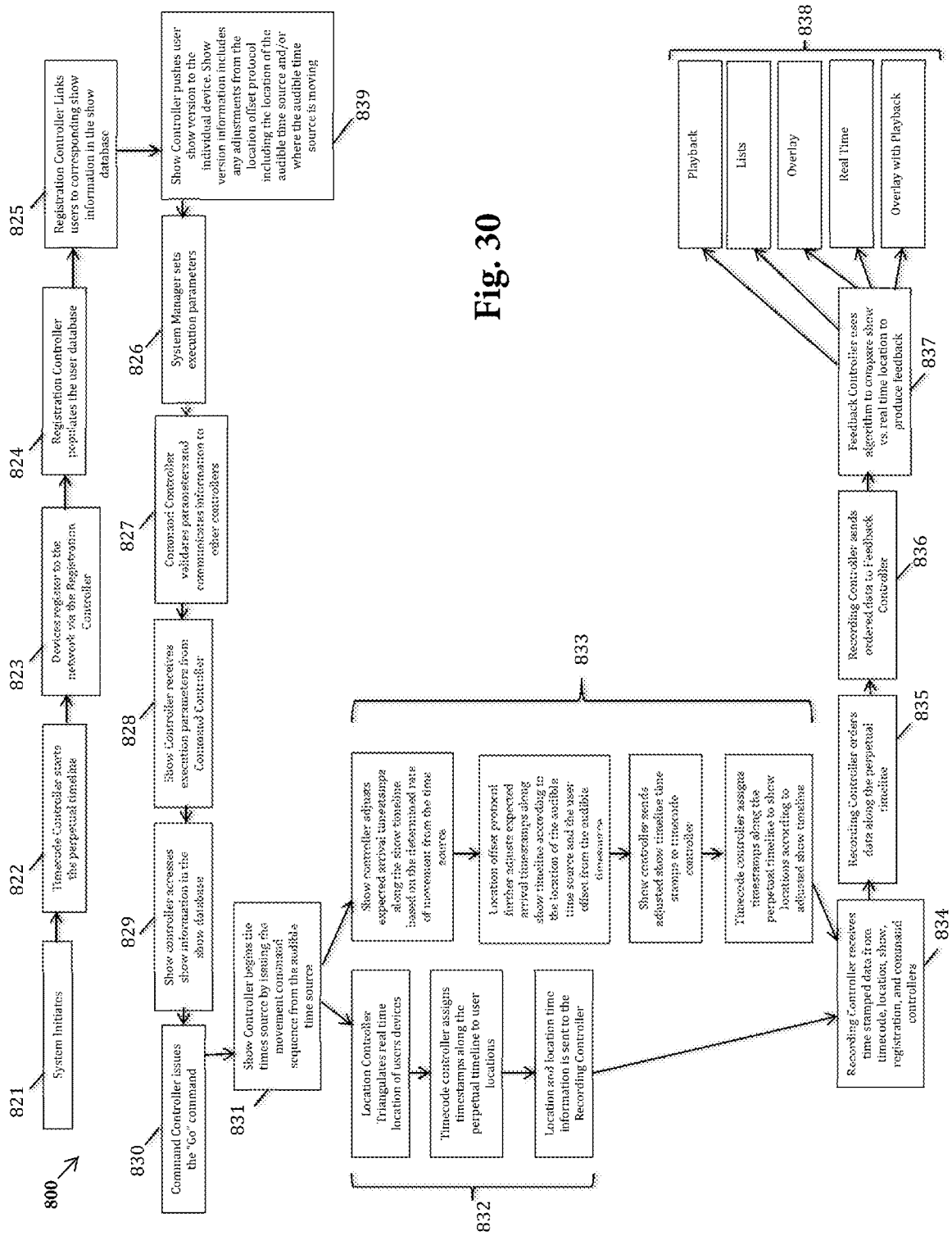
FIG. 30 illustrates an embodiment of the process of location tracking and providing feedback.

FIG. 30 illustrates an embodiment of the system process 800. FIG. 30 illustrates the process of monitoring user movements and tagging them to a timeline along with a show timeline to provide accurate and efficient feedback to the user. As described in FIG. 30, the system initiates 821 and the timecode controller starts the perpetual timeline 822. One or more user devices register to the network via the registration controller in step 823. The registration controller then populates the user database 824. In step 825, the registration controller can link the user to corresponding show information in the show database. In some embodiments, as shown in step 839, the show controller can push a user show version to the individual device and the show version information can include adjustments from the location offset protocol including the location of the audible time source and/or where the audible time source is moving. The system manager can set the execution parameters 826, for example, as shown in FIG. 21, and in step 827 the command controller validates the parameters and communicates information to the other controllers. The show controller then receives the execution parameters from the command controller 828 and the show controller accesses show information in the show database 829. The command controller issues the "Go" command 830. In step 831, the show controller begins the time source by issuing the movement command sequence from the audible time source.

The system then begins tracking of the locations of the user devices. Two processes can be used to accurately and efficiently track the user device locations. The location/location time process 832 includes several steps to produce information for the location and timestamps of the user location. The location controller triangulates location of user devices and the timecode controller assigns timestamps along the perpetual timeline to the user locations. The location and the location time information are then sent to the recording controller.

In some embodiments, the show controller can produce show timeline timestamps with the adjustments from the location offset protocol as described in step 839 and those adjustments can be calculated and provided to the system. In other embodiments, the show controller can produce the adjustments from the location offset protocol using the detected or tracked location and the location of the audible time source as described in step 833. The show timeline timestamps process 833 includes several processes to produce show timeline time stamps. The show controller adjusts the expected arrival timestamps along the show timeline based on the determined rate of movement from the time source. The location offset protocol is then used to further adjust expected arrival timestamps along the show timeline according to the location of the audible time source and the user offset from the audible time source. The show controller sends adjusted show timeline time stamps to the timecode controller. The timecode controller assigns the adjusted show timeline timestamps along the perpetual timeline to show the locations of the users according to the adjusted show timeline. Either step 839 or step 833 can be used to provide the location offset to adjust the arrival timestamps or expected arrival timestamps according to the location of the audible time source and/or where the audible time source is moving.

In some embodiments, the location/location time process 832 and show timeline timestamps process 833 can be performed in parallel in the system. In some embodiments, the location/location time process and show timeline timestamps process can be performed separately or one after the other. For example, the location/location time process 832 can be performed first and the show timeline timestamps process 833 can be performed after. In some embodiments, the show timeline timestamps process 833 can be performed first and the location/location time process 832 can be performed after.

After the location/location time process 832 is completed, the location and location time information is sent to the recording controller and after the show timeline timestamps process 833 is completed, the timestamped data is sent to the recording controller. The recording controller receives the timestamped data from the timecode controller, and the location and location time information from the location controller at step 834. The recording controller orders the data along the perpetual timeline in step 835 and sends the ordered data to the feedback controller in step 836. Then in step 837 the feedback controller uses the system to compare show verses location to produce feedback. The feedback controller can display or output the feedback information and/or data to the user device or other output device as described herein. The feedback information can be in various useable forms that allow for a comparison between the expected data set and the actual information that is collected and catalogued by the system. The feedback information 838 can be in the form of, but not limited to, playback, lists, overlay, substantially instantaneous, and/or overlay with playback. Additionally, in some embodiment, the rate of movement of a user is tracked and provided in relation to the frequency of the audible time source. In some embodiment, the rate of movement can be determined based on the distance from the first position of the user to the second position of the user with respect to the predetermined frequency from the audible time source. In some embodiments, this can be used to provide feedback of foot timing and foot space as illustrated in FIG. 25. In some embodiments, the frequency can be the beats per minute or other rate of the signal from the audio source. The frequency can refer to the tempo. This frequency in beats per minute is not to be confused with frequency as it relates to a musical note or a transmission frequency.

A more detailed outline of the system and associated functions and its embodiments are included herein. The various features described can be used alone or in combination to achieve the desired functions for the location system.

All of the features disclosed in this specification (including any accompanying exhibits, claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the principles and features disclosed herein. Certain embodiments of the disclosure are encompassed in the claim set listed below or presented in the future.

Terminology

A number of computing systems have been described throughout this disclosure. The descriptions of these systems are not intended to limit the teachings or applicability of this disclosure. For example, the user systems 600 described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated can be distributed across multiple computing systems, or combined into a single computing system. The data repositories shown can represent physical and/or logical data storage, including, for example, storage area network or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multithreaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," or "one of X, Y, and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each can be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description.

What is claimed is:

1. A system for tracking position of a moving transmission source, the system comprising:
    a first transmission source configured to transmit a first signal while moving from a first position to a first expected position;
    a receiver configured to receive the transmitted first signal;
    an audio source configured to transmit an audio signal at a predetermined frequency; and
    a controller configured to electronically couple with the receiver;
    wherein the controller is further configured to:
        determine a second position of the first transmission source in a field based on the received first signal;
        calculate a first location offset between the second position of the first transmission source with the first expected position of the first transmission source, the first expected position stored in a first data repository;
        compare the first location offset with a predetermined threshold;
        calculate a first rate of movement of the first transmission source from the first position to the second position of the first transmission source, wherein the first rate of movement is calculated based on a distance traveled between the first position and the second position of the first transmission source with respect to the predetermined frequency; and
        transmit a first indication to at least one user device based on the comparison of the first location offset with the predetermined threshold, wherein the first indication comprises the calculated first rate of movement.

2. The system of claim 1, wherein the controller is further configured to construct a user interface for display, the user interface comprising:
    a graphical depiction of the field;
    a first indicia with respect to the graphical depiction of the field indicating the first expected position; and
    a second indicia with respect to the graphical depiction of the field indicating the determined second position;
    wherein the second indicia includes a display characteristic, wherein the display characteristic is a function of the first location offset and wherein the display characteristic comprises at least one of the following: a color, a symbol, an image, and a pattern.

3. The system of claim 1, wherein the first expected position comprises a first arrival timestamp, wherein the first arrival timestamp is calculated based on a predetermined value and distance between the first expected position and a position of the audio source.

4. The system of claim 1, further comprising:
a second transmission source, wherein the second transmission source is configured to transmit a second signal while moving from a third position to a second expected position; and
the receiver configured to receive the transmitted second signal;
wherein the controller is further configured to:
determine a fourth position in the field based on the received second signal;
calculate a second location offset between the fourth position with the second expected position of the second transmission source, the second expected position stored in a second data repository;
compare the second location offset with the predetermined threshold;
calculate a second rate of movement of the second transmission source from the third position to the fourth position, wherein the second rate of movement is calculated based on a distance traveled between the third position and the fourth position of the second transmission source with respect to the predetermined frequency; and
transmit a second indication to at least one user device based on the comparison of the second location offset with the predetermined threshold, wherein the second indication comprised the second calculated rate of movement.

5. The system of claim 4, wherein the controller is further configured to construct a user interface for display, the user interface comprising:
a graphical depiction of the field;
a first indicia with respect to the graphical depiction of the field indicating the first expected position; and
a second indicia with respect to the graphical depiction of the field indicating the determined second position;
a third indicia with respect to the graphical depiction of the field indicating the second expected position; and
a fourth indicia with respect to the graphical depiction of the field indicating the determined fourth position;
wherein the second indicia includes a first display characteristic, wherein the first display characteristic is a function of the first location offset;
wherein the fourth indicia includes a second display characteristic, wherein the second display characteristic is a function of the second location offset; and
wherein the first and second display characteristics comprises at least one of the following: a color, a symbol, an image, and a pattern.

6. The system of claim 4, wherein the second expected position comprises a second arrival timestamp, wherein the second arrival timestamp is calculated based on a predetermined value and distance between the second expected position and a position of the audio source.

7. The system of claim 1, wherein the controller is further configured to construct a user interface for display, the user interface comprising:
a list, the list comprising:
a first entry corresponding to the first expected position;
a second entry corresponding to the second position, and
at least one indicia comprising at least one display characteristic, wherein the at least one display characteristic is a function of the first location offset;
wherein the at least one display characteristic comprises at least one of the following: a color, a symbol, an image, and a pattern.

8. The system of claim 1, wherein the user device comprises at least one of the following: a mobile device; a personal computer; and a tablet.

9. The system of claim 1, wherein the transmission source comprises at least one of the following: a mobile device; a tablet; an earpiece; and a body antennas.

10. The system of claim 1, wherein the predetermined frequency is measured in beats per minute.

11. A method for tracking position of a moving transmission source, the method comprising:
transmitting a first signal from a first transmission source while moving from a first position to a first expected position;
receiving the transmitted first signal by a receiver;
transmitting an audio signal at a predetermined frequency from an audio source; and
electrically coupling a controller with the receiver;
determining a second position of the first transmission source in a field based on the received first signal;
calculating a first location offset between the second position of the first transmission source with the first expected position of the first transmission source, the first expected position stored in a first data repository;
comparing the first location offset with a predetermined threshold;
calculating a first rate of movement of the first transmission source from the first position to the second position of the first transmission source, wherein the first rate of movement is calculated based on a distance traveled between the first position and the second position of the first transmission source with respect to the predetermined frequency; and
transmitting a first indication to at least one user device based on the comparison of the first location offset with the predetermined threshold, wherein the indication comprised the calculated first rate of movement.

12. The method of claim 11, further comprising:
constructing a user interface for display;
displaying a graphical depiction of the field, the graphical depiction comprising:
a first indicia with respect to the graphical depiction of the field indicating the first expected position of the user; and
a second indicia with respect to the graphical depiction of the field indicating the determined second position;
wherein the second indicia includes a display characteristic, wherein the display characteristic is a function of the first location offset and wherein the display characteristic comprises at least one of the following: a color, a symbol, an image, and a pattern.

13. The system of claim 12, wherein the first expected position comprises a first arrival timestamp, wherein the first arrival timestamp is calculated based on a predetermined value and distance between the first expected position and a position of the audible time source.

* * * * *